(12) United States Patent
Falash et al.

(10) Patent No.: US 10,311,742 B2
(45) Date of Patent: *Jun. 4, 2019

(54) ADAPTIVE TRAINING SYSTEM, METHOD, AND APPARATUS

(75) Inventors: Mark Falash, Oviedo, FL (US); Eytan Pollak, Oviedo, FL (US); Michael Barnoske, Orlando, FL (US)

(73) Assignee: L-3 Technologies, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/118,877

(22) PCT Filed: Sep. 4, 2012

(86) PCT No.: PCT/US2012/053700
§ 371 (c)(1),
(2), (4) Date: Nov. 19, 2013

(87) PCT Pub. No.: WO2013/033723
PCT Pub. Date: Mar. 7, 2013

(65) Prior Publication Data
US 2014/0186810 A1    Jul. 3, 2014

Related U.S. Application Data

(60) Provisional application No. 61/530,348, filed on Sep. 1, 2011.

(51) Int. Cl.
*G09B 5/06* (2006.01)
*G09B 7/00* (2006.01)
(Continued)

(52) U.S. Cl.
CPC ................. *G09B 5/06* (2013.01); *G09B 7/00* (2013.01); *G09B 7/04* (2013.01); *G09B 9/02* (2013.01)

(58) Field of Classification Search
CPC ... G09B 9/00; G09B 9/02; G09B 9/05; G09B 9/052; G09B 9/08; G09B 9/30; A61B 5/16; A61B 5/165
See application file for complete search history.

(56) References Cited

U.S. PATENT DOCUMENTS

| | | | |
|---|---|---|---|
| 4,683,891 A * | 8/1987 | Cornellier | A61B 5/0533 128/905 |
| 5,287,489 A | 2/1994 | Nimmo et al. | |

(Continued)

FOREIGN PATENT DOCUMENTS

| | | |
|---|---|---|
| EP | 0483991 A2 | 5/1992 |
| EP | 2439718 A1 | 4/2012 |

(Continued)

OTHER PUBLICATIONS

Ok-Choon Park, Jung Lee, "Adaptive Instructional Systems", Handbook of Research on Educational Communications and Technology, Chapter 25, Association for Educational Communications and Technology, http://learngen.org/~aust/EdTecheBooks/AECT%20HANDBOOK%202ND/25.pdf.

(Continued)

*Primary Examiner* — Peter Egloff
(74) *Attorney, Agent, or Firm* — Tiajoloff & Kelly LLP

(57) ABSTRACT

A system and method for training a student employ a simulation station that displays output to the student and receives input. The computer system has a rules engine operating on it and computer accessible data storage storing (i) learning object data including learning objects configured to provide interaction with the student at the simulation system and (ii) rule data defining a plurality of rules accessed by the rules engine. The rules data includes, for each rule, respective (a) if-portion data defining a condition of data and (b) then-portion data defining an action to be performed at the simulation station. The rules engine causes (Continued)

the computer system to perform the action when the condition of data is present in the data storage. For at least some of the rules, the action comprises output of one of the learning objects so as to interact with the student.

21 Claims, 17 Drawing Sheets

(51) Int. Cl.
*G09B 7/04* (2006.01)
*G09B 9/02* (2006.01)

(56) References Cited

U.S. PATENT DOCUMENTS

| | | | |
|---|---|---|---|
| 6,035,737 | A | 3/2000 | Prater |
| 6,053,737 | A | 4/2000 | Babbitt et al. |
| 6,186,794 | B1 | 2/2001 | Brown et al. |
| 6,206,700 | B1 | 3/2001 | Brown et al. |
| 6,427,063 | B1 | 7/2002 | Cook et al. |
| 6,606,479 | B2 | 8/2003 | Cook et al. |
| 6,915,104 | B2 | 7/2005 | Yonezu et al. |
| 7,016,888 | B2 | 3/2006 | Slemmer et al. |
| 7,052,277 | B2 | 5/2006 | Kellman |
| 7,467,121 | B2 | 12/2008 | Hagelin |
| 7,512,577 | B2 | 3/2009 | Slemmer et al. |
| 7,895,136 | B2 | 2/2011 | Slemmer et al. |
| 7,949,295 | B2 | 5/2011 | Kumar et al. |
| 8,113,844 | B2 | 2/2012 | Huang et al. |
| 8,170,976 | B2 | 5/2012 | Dargue et al. |
| 2003/0039948 | A1 | 2/2003 | Donahue |
| 2003/0233155 | A1 | 12/2003 | Slemmer et al. |
| 2004/0161731 | A1* | 8/2004 | Arington et al. ............ 434/262 |
| 2005/0277099 | A1 | 12/2005 | Van Schaack et al. |
| 2006/0078856 | A1 | 4/2006 | Kellman |
| 2006/0195412 | A1 | 8/2006 | Slemmer et al. |
| 2007/0122778 | A1* | 5/2007 | Beitel et al. ................ 434/219 |
| 2008/0145830 | A1 | 6/2008 | Huang et al. |
| 2009/0035733 | A1 | 2/2009 | Meitar et al. |
| 2009/0187519 | A1 | 7/2009 | Slemmer et al. |
| 2009/0208910 | A1* | 8/2009 | Brueckner ............... G09B 5/00 434/11 |
| 2010/0003659 | A1 | 1/2010 | Edmonds |
| 2010/0041007 | A1 | 2/2010 | Wang |
| 2010/0100520 | A1 | 4/2010 | Dargue et al. |
| 2010/0190142 | A1 | 7/2010 | Gal et al. |
| 2010/0190143 | A1 | 7/2010 | Gal et al. |
| 2010/0190145 | A1 | 7/2010 | Singer et al. |
| 2011/0076649 | A1* | 3/2011 | Best et al. .................... 434/69 |
| 2011/0121938 | A1 | 5/2011 | Slemmer et al. |
| 2011/0283866 | A1 | 11/2011 | Hogan |

FOREIGN PATENT DOCUMENTS

| | | | |
|---|---|---|---|
| KR | 10-2002-0030305 A | | 4/2002 |
| KR | 10-2002-0090751 A | | 12/2002 |
| RU | 48661 U1 | | 10/2005 |
| WO | 2010044982 A1 | | 4/2010 |
| WO | 2010-083563 A1 | | 7/2010 |

OTHER PUBLICATIONS

Richard C. Atkinson, "Adaptive Instructional Systems", Psychology and Education Series, Technical Report No. 240, Nov. 20, 1974, Stanford University, Stanford, California, http://suppes-corpus.stanford.edu/techreports/IMSSS_240.pdf.

Small Business Innovation Research, "Adaptive Instructional Systems", U. S. Army Research Institute Rotary-Wing Aviation Research Unit, Fort Rucker, AL.

Third Clips Conference Proceedings, NASA Conference Publication 10162 vol. I, Washington, D.C., NASA Center for AeroSpace Information, 1994.

Zhang et al., "Program-level Adaptive Memory Management", ISMM'06, Jun. 10-11, 2006, Ottawa, Ontario, Canada, http://anon.cs.rochester.edu/u/zhangchl/publications/ismm06.pdf.

Ludwig et al., "Developing an Adaptive Intelligent Flight Trainer", 2005, www.dtic.mil/cgi-bin/GetTRDoc?Ad=ADA439799.

"Software to Detect Malfunctions in Anesthesia Equipment", Nasa Tech Briefs, Lyndon B. Johnson Space Center, Houston, Texas, Aug. 1, 2000.

Espacenet English language abstract of KR 10-2002-0030305, published Apr. 25, 2002.

Espacenet English language abstract of KR 10-2002-0090751, published Dec. 5, 2002.

Dr. Painter et al., "General Aviation Pilot Advisory and Training System Semiannual Technical Progress Report", pp. 1-36, Sep. 16, 1997.

April Broomer, "CAE Simfinity™Suite of training devices", retrieved Mar. 14, 2011.

* cited by examiner

ADAPTIVE TRAINING SYSTEM, METHOD, AND APPARATUS

PRIOR APPLICATIONS

This application claims the benefit of U.S. provisional application Ser. No. 61/530,348 filed Sep. 1, 2011, which is herein incorporated by reference in its entirety.

FIELD OF THE INVENTION

This invention relates to computerized training systems, and more particularly computerized training systems where the computer administers the training. The preferable environment is a computerized system with associated devices that immerse students in emotionally engaging and functional operational environments throughout the learning experience, such as those relying on simulation for the training, e.g., for flight simulation or other vehicle simulator.

BACKGROUND OF THE INVENTION

Computerized training systems of many types exist. In the area of training in vehicle operation, these frequently employ a simulator station that emulates the actual vehicle, often accomplished using a dummy vehicle control panel with a simulated out-the-window scene visible to the trainee. The training takes place in a virtual environment created by a pre-programmed computer system.

Simulator systems are generally expensive and it is very desirable to make maximum use of each piece of hardware, to reduce the overall costs of the equipment for the training results conferred.

Known training systems provide the trainee with classroom lessons and computer based training (CBT) delivered by computer or by a human instructor, followed by an after-action review that is given to the trainee from which the effectiveness of the training on the trainee can be determined. If the assessment is not positive for the trainee having been effectively trained by the course of instruction, the computer system either repeats the instruction process for the trainee, or initiates a remedial process to bring the trainee up to an effective level. This rigid sequential process is repeated for all trainees who follow the identical sequence of instruction until the assessment indicates adequate effectiveness of the training.

This process can result in wasteful or inefficient and costly use of the training resources, e.g., the simulator, because the varying skill levels of the trainees, and varying effectiveness of the course of instruction on each trainee. The most advanced student or trainee may be exposed to steps of training for less difficult aspects of the training, making that trainee bored, and also wasting the training time by trying to teach things that the trainee already knows. On the other hand, a less expert, moderately-skilled individual may be given additional instruction that is not necessary while at the same time being given less instruction in certain areas where he requires additional instruction and training, resulting in more repeat work. Finally, there is the very low-skilled trainee that needs to learn virtually everything, and has difficulties with addressing some of the more difficult aspects of the training, possibly missing basics, and therefore being unable to benefit from the remainder of the more advanced segment of the instruction set.

Similarly, different courses of training may have differing effectiveness depending on the nature of the trainees. As a result, training methods that are not effective for a given trainee may be administered, and their lack of effectiveness can only be determined after the training system has been occupied for a full instruction session.

For the foregoing reasons, current learning systems are not making efficient use of the available hardware and computer support systems and personnel.

SUMMARY OF THE INVENTION

It is accordingly an object of the present invention to provide a computerized learning system, especially a computerized simulation system, in which a trainee is efficiently provided with instructions that are appropriate to his skill level and his personal leaning parameters as they are determined by the assessment of the ongoing instruction or by prior identified leaning preferences of the trainee. Preferably, the system supports self-paced learner-driven discovery while continuously targeting the learner's KSA (Knowledge, Skill, Ability) gap. The system may rely on full simulation, which may be real (i.e., using a real device in the training for its use), simulated (as with touch screen I/O devices that emulate the device being trained for) or based on a model (or dummy copy) of the device or devices, the use of which is being trained.

According to an aspect of the invention, a system for training a student comprises a simulation station configured to interact with the student and a computer system. The simulation system displays output to the student via at least one output device and receives input via at least one input device. The computer system has a rules engine operative on it and computer accessible data storage operatively associated with it and storing (i) learning object data including a plurality of learning objects each configured to provide interaction with the student at the simulation system, and (ii) rule data defining a plurality of rules accessed by the rules engine. The rules data includes, for each rule, respective (a) if-portion data defining a condition of data and (b) then-portion data defining an action to be performed at the simulation station. For at least some of the rules, the respective action comprises output of a respective one of the learning objects so as to interact with the student. The rules engine causes the computer system to perform the action when the condition of data is present in the data storage.

According to another aspect of the invention, a method for providing computerized training to a student comprises providing a simulation station connected with a computer system with computer-accessible data storage supporting a rules engine thereon. Lesson data is stored in the data storage so as to be accessed by the rules engine. This lesson data comprises learning object data defining a number of learning objects that each, when activated by the rules engine, cause the simulation station to output visual imagery, audio or other output and rules data defining a plurality of rules on which the rules engine operates so as to administer the computerized training.

The rules each have a data condition part and an action part. The data condition part defines a state of data in the data storage that, when present, causes the rules engine to direct the computerized system to take a predetermined action. At least some of the actions comprise activating at least some of the learning objects to interact with the student at the simulation station.

Student state data is also stored in the data storage. The student state data includes data defining an assessment measure of training of the student.

The computerized training is provided to the student at the simulation station with the rules engine administering the training according to the rules stored in the data storage. The assessment measure for the student is determined repeatedly or continually based on input received from the student at the simulation station, and the determined assessment measure is stored in the student state data. The rules data defines at least one rule that initiates the action thereof when a data condition that the student state data in the data storage defines an assessment measure below a predetermined value is present, and the action includes initiating operation on the simulation station of one of the stored learning objects.

According to another aspect of the invention, objects of the invention are accomplished using a computerized training interface system having input and output capabilities, and a computerized system connected with it that preferably operates using an inference engine or a rules engine. The rules engine is programmed with a set of rules as will be described herein that allow it or enable it to administer flexibly the training of a trainee in an immersive training station.

An Intelligent Decision Making Engine (IDME) is a data-driven computer system, preferably a rule based inference engine implemented using a CLIPS software package, which is available as open-source public domain software, that implements actions or procedures responsive to specified qualities of data being stored. The rules are continuously active once loaded, and are configured to allow for continuous adaptive modification of any instruction and other interactions with the trainee of the training station in real time, an interactive adaptive learning system, as will be described herein. The CLIPS software and its operation are described inter alia in the Third Conference on CLIPS Proceedings (Electronic Version) available publicly at http://clipsrules.sourceforge.net/documentation/other/3CCP/pdf, NASA Conference pub. 10162 Vol. 1 (1994), which is herein incorporated by reference in its entirety.

Because the use of a rules engine makes the reaction to changes in the data immediate, the adaptive process of the invention is especially efficient at delivering training. It may be said that the rules engine system provides for a higher-resolution or finer-grain adaptive learning than is available in the prior art due to the immediacy of the reaction of the rules-based system.

The organization of rules is prepared by the training staff and generally provides for at least one of
(1) remedial instruction action when there is an indication of failure or ineffectiveness of the training,
(2) increased training difficulty when the assessment indicates that the trainee has too high a level of ability for the immediate level or subject matter of the training, and
(3) an adjustment of type of training to better address the training requirements of the individual trainee.

These assessments and changes are executed continuously as the instruction progresses, and as soon as any indication of inefficiency of use of the resources is present in the data base of the rules engine. The continuous performance assessment targets the individual learner lesson adaption to the state of the learner. The complexity and pace of the lesson are adapted to regulate learner engagement and maximize learning and retention.

Other advantages and objects will become obvious from the present specification.

DETAILED DISCLOSURE

Figure 1:
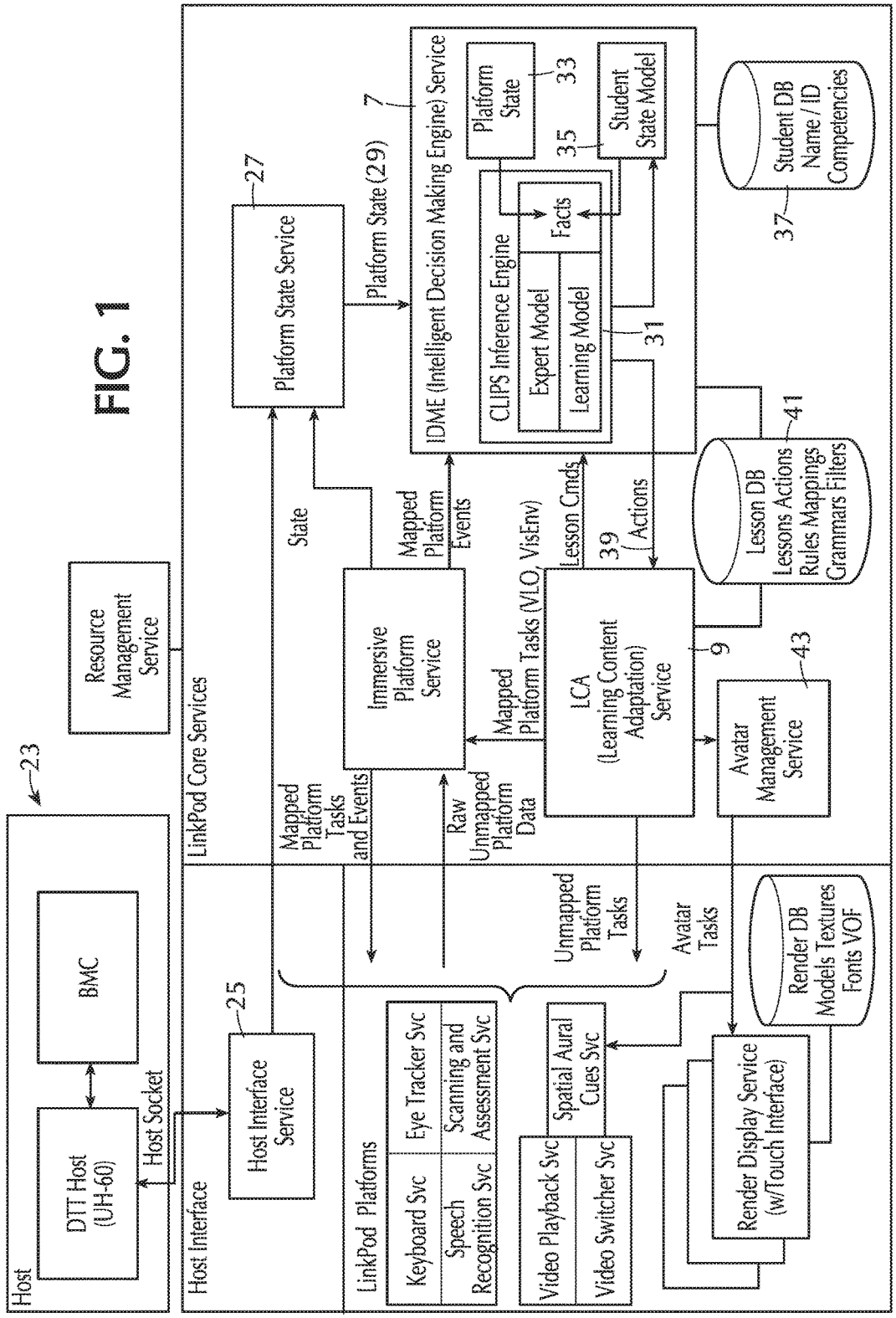
FIG. 1 is a schematic view of the overall simulation system according to the invention.

FIG. 1 shows a diagram of an embodiment of the system architecture of the computer system controlling the operation of a LinkPod™ training system, which may be used for a variety of training purposes, especially for training in operation of vehicles, such as a flight simulator.

The system is implemented in a computer system, which may comprise one computer or a plurality of computers linked by a network or local connection over which system operation is distributed. The computer system or systems may run operating systems such as LINUX or Windows, and their operations are controlled by software in the form of computer-executable instructions stored in computer-accessible data memory or data storage devices, e.g., disk drives. The computers also include typical computer hardware, i.e., a central processor, co-processor or multi-processor, memory connected to the processor(s), and connected devices for input and output, including data storage devices that can be accessed by the associated computer to obtain stored data thereon, as well as the usual human operator interfaces, i.e., a user-viewable display monitor, a keyboard, a mouse, etc.

The databases described herein are stored in the computer-accessible data storage devices or memory on which data may be stored, or from which data may be retrieved. The databases described herein may all be combined in a single database stored on a single device accessible by all modules of the system, or the database may be in several parts and stored in a distributed manner as discrete databases stored separate from one another, where each separate database is accessible to those components or modules of the system that require access to operate according to the method or system described herein.

Figure 2:
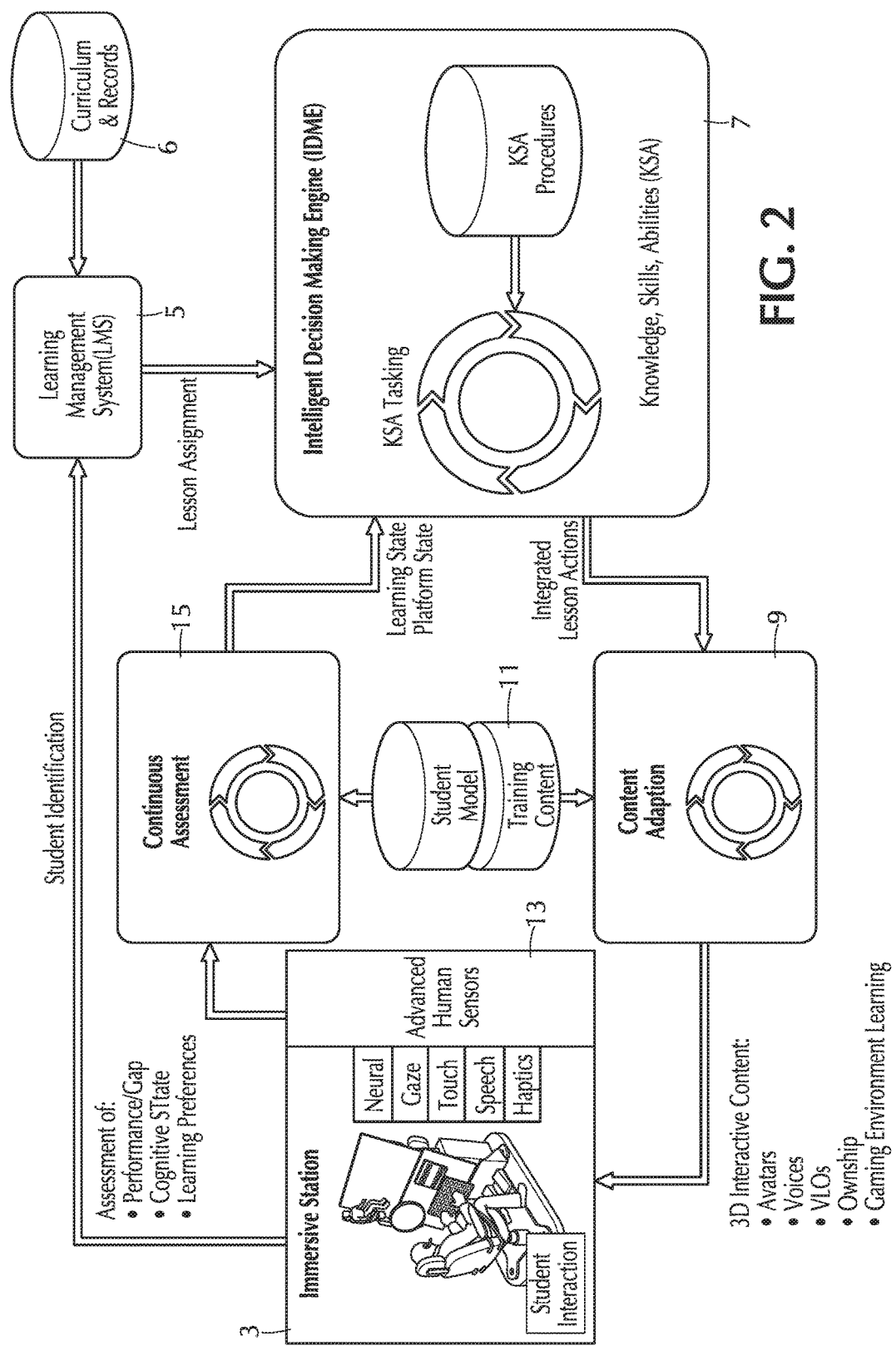
FIG. 2 is a schematic view of the internal operation of a training system according to the invention.
Figure 5:
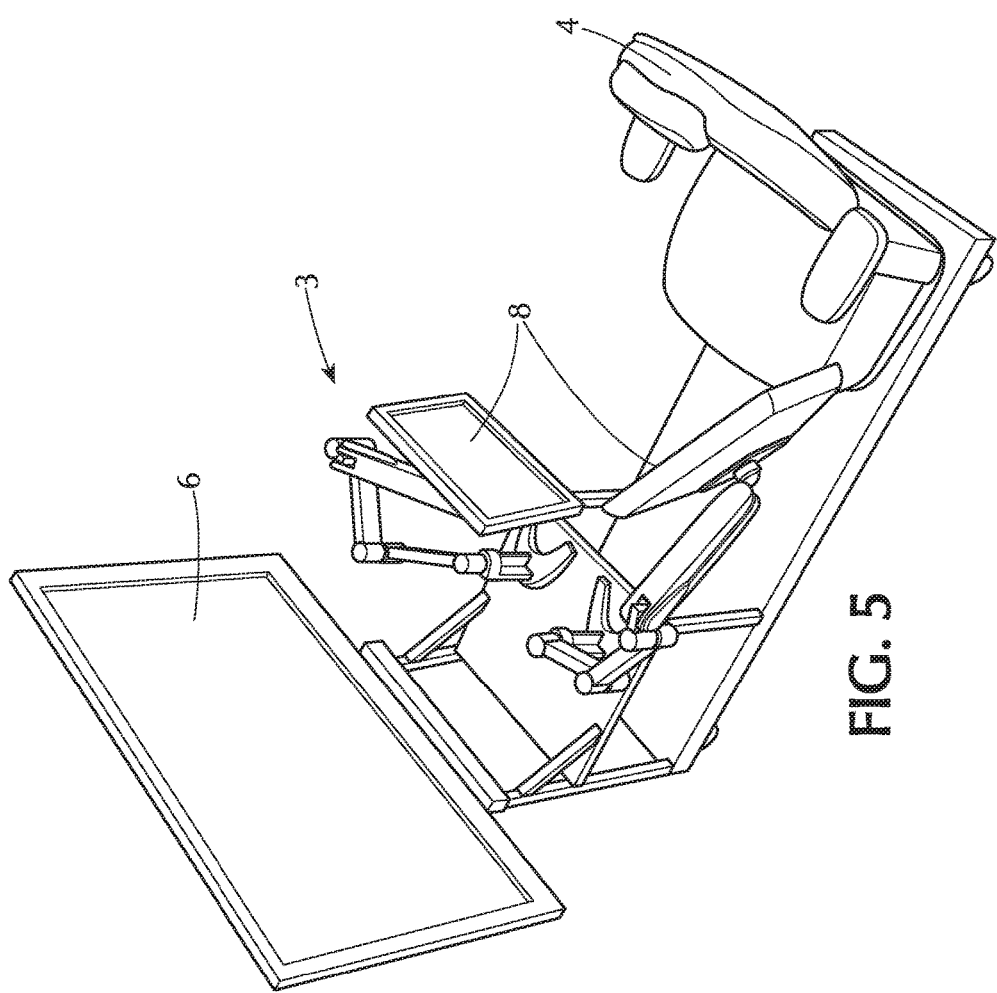
FIG. 5 is a perspective view of an exemplary simulation system using the present invention.

Referring to FIG. 2, the overall LinkPod™ system comprises an immersive station 3, which is an adaptable training station with a number of input and/or output devices accessible by user. Referring to FIG. 5, the immersive station 3 in the preferred embodiment comprises a seat 4 for a user and displays, including a larger 3D HDTV resolution display 6 and two or more touch sensitive I/O screens 8 supported for adjusting movement. The touch screens can be used to display a cockpit of any vehicle or the specific device the training is for, so the station 3 can be used for a variety of possible training courses for a variety of different vehicles or aircraft. The immersive station 3 also has an eye tracker that detects the direction that the trainee is looking in and generates a data signal carrying that information. All the displays 6 and 8 are connected with and controlled by a local computer system that supports the immersive station 3 as a platform. The base of the station 3 is a frame supported on casters, which allow for easy movement of the station 3 as desired.

Figure 4:
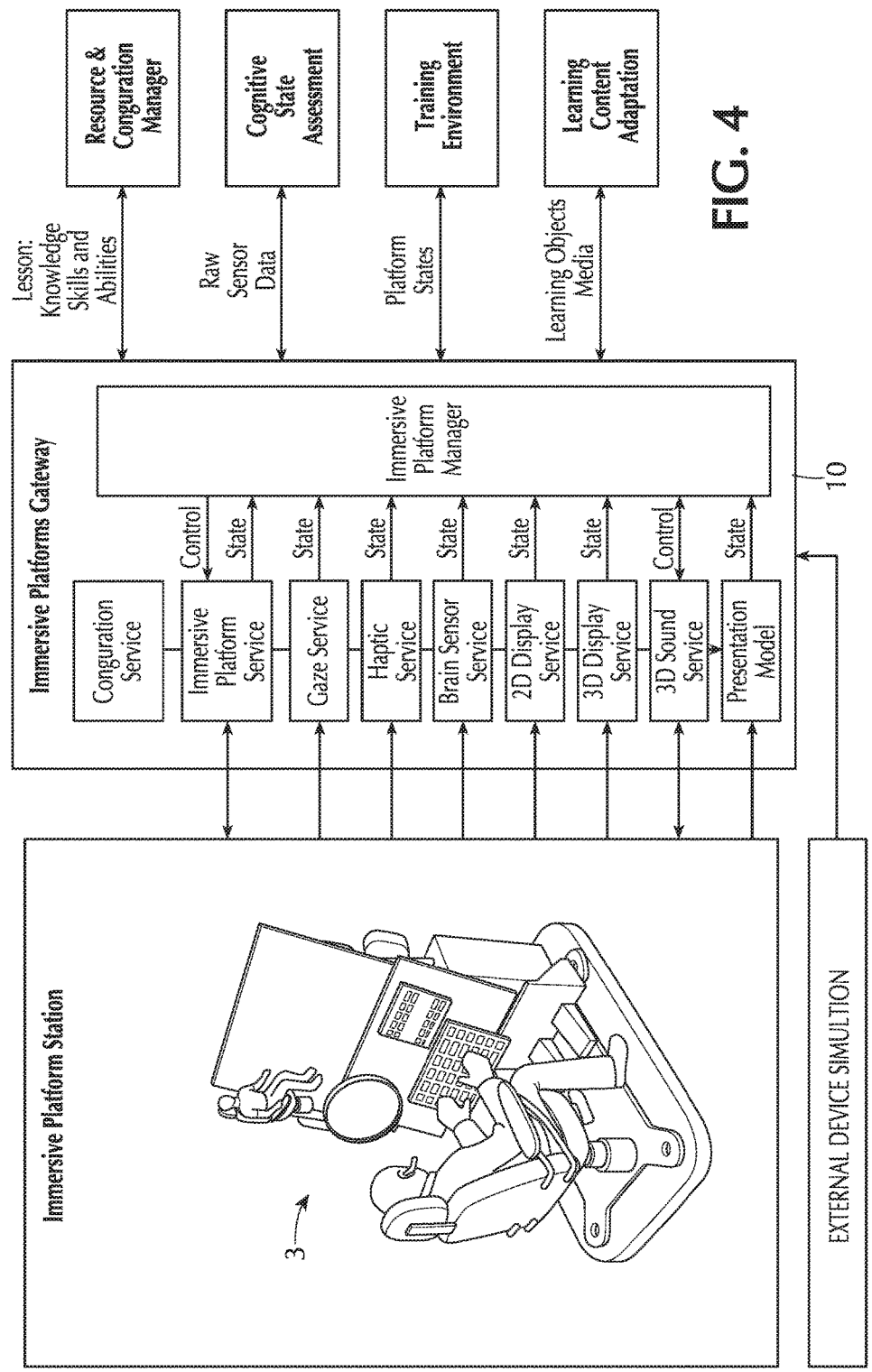
FIG. 4 shows an example of an immersive platform station for use as the training station for the invention, together with a schematic illustration of the peripheral devices attached thereto and the associated software support from the computer controlling system.

As illustrated in FIG. 4, the immersive platform station computer system 10 runs an immersive platform manager software module 14, which operates a selected configuration of the trainee station 3. The platform support includes support of the main display 6, the interactive displays 8, the eye tracker or gaze detector, a haptic system, a brain sensor system, which can detect certain neurological parameters of the trainee relevant to the training, sensors that can detect the trainee's posture, and also a 3D sound system, and a microphone, and any other hardware that is desired for trainee station. The various components of the system return electrical signal data that is processed by platform manager 10 and transmitted to other modules of the system.

It will be understood that a plurality of immersive stations 3 can be supported in parallel by a system according to the invention.

The immersive station 3 is electronically connected by a network data link or local connection with a computerized learning management system (LMS) 5. Generally, the LMS 5 is supported on a separate computer system via a network, and it may be connected to a number of training stations 3 locally or remote from its location. The LMS stores all the data, including videos and other information and media files used in the lessons, as well as data defining the students that use the system and data relating to administration of training with the various training stations 3 connected therewith via one or more networks or the Internet. The LMS is similar to training management systems known to those of skill in the art, in that it communicates with the immersive station 3 so as to display a prompt and it receives student log-in identification data, typically comprising an ID and a password, from the immersive station 3 entered by the trainee through an interactive screen 8 at the immersive station 3. The LMS then lists the possible courses of instruction available to the trainee, and receives a responsive communication through the interactive device 8 that selects a course. The LMS then loads the respective training station 3 with the necessary training data resources, media, software that supports hardware needed for the specific training selected, and other data as will be described herein, and also and initiates the system of the training station to present the course to the trainee.

Referring to FIG. 2, LMS 5 is connected with and accesses stored curriculum and records database 6. This database contains the data needed to administer training in the system, including history of the student or students. Selection of a course of training responsive to trainee log-in and other selection input, causes the LMS to load the requisite lessons, rules, and other data into the appropriate data storage or memory so as to be accessible by the components of the system that are involved in delivery of training at the immersive station 3.

The system further includes an intelligent decision making engine (IDME) indicated at 7. Learning management system 5 communicates internally with IDME 7, which in the preferred embodiment is a rules-based inference engine supported on a computer system in the training station 3. The IDME rules run via an API of CLIPS rules-engine software running on the host computer. The IDME 7 has computer accessible memory that is loaded by the LMS 5 with the rules needed for the specific selected training operation. Preferably, the IDME has access to a database shared with other components of the system that contains training data, as will be described herein.

The IDME rules engine operates according to a set of rules that are loaded into the associated storage or memory so as to be accessible by the IDME. Each rule specifies a condition of data in the associated database, if the data value of a current measure of effectiveness for the current trainee is below a predetermined threshold value, etc. The rule also specifies an action that is to be taken whenever that condition of data is satisfied, such as, e.g., to display a question to the trainee and wait for a response. The rules engine is a data-driven system, in that the state of the data in the associated database immediately triggers prescribed actions when it satisfies the condition of the rule. As such, the set of rules loaded in the IDME all operate continuously and simultaneously based on the state of data accessible to the IDME, and the rules trigger actions that will be taken in the training process at the immersive station 3 at whatever point in time the associated data condition of the rule is met.

When the rules dictate, the IDME 7 passes, sends or otherwise transfers data to a content adaption module 9 that corresponds to actions, i.e., commands to perform integrated lesson actions.

Content adaption module 9 is also implemented using a software system running on a computer, and the IDME and the content adaption module 9 may be both supported on the same computer. Content adaption module 9 also has access to a data storage device 11 storing data containing training content, e.g., materials, recorded instruction and various other software and data that is used in providing simulation or training to the user at station 3, and it controls the operation of the instruction and/or simulation conducted at immersive station 3. In particular, the content adaption module 9 causes the immersive station displays and sound system to display avatars delivering audible content, voice instruction, and other actions. Those other actions include interfacing with an external simulation or live device running a computerized simulation of the vehicle of the training by displaying the correct controls on the interactive screens and with an appropriate out-the-window display on the main display 6 created by a computerized image generator, not shown, that renders real-time video based on virtual scene data, as is well known in the art of flight or other vehicle simulation.

Content adaption module 9 uses training content 11 to provide to immersive station 3 the necessary training events. As the training proceeds, the various trainee sensors and input devices generally indicated at 13, e.g., eye-tracking, gaze or blink detection, neural detectors, touchscreens or other touch-based simulated control panel or cockpit input/output devices, a microphone listening for speech, and optionally detectors from which body position or posture may be detected, detect actions or conditions of the trainee and transmit data therefrom to continuous assessment module 15.

The continuous assessment module 15 is also implemented using a software system running on a computer. Preferably, the IDME and the continuous assessment module 15 are both supported on the same computer located geographically at the simulation station 3. The assessment module 15 may be independent of the IDME, or more preferably, the assessment module 15 may be constitute as set of Assessment Rules (see FIG. 10) incorporated into the rules data as a subset of the total rules data on which the IDME operates. As rules data, the assessment activities may be seamlessly interwoven with the activation of learning objects transmitting output that triggers input of the trainee that may be used to assess a measure of performance (MOP) of the student, or a measure of effectiveness (MOE) of the training as it is given.

Continuous assessment module 15 provides continuous assessment of the trainee such as by analysis of responses or activities of the trainee at the immersive station 3. The continuous assessment module 15 generally produces data that is an assessment of the knowledge, skill and ability (KSA) of the trainee. Knowledge is the retention by the trainee of certain information necessary to operate the vehicle, e.g. the location of the switch for the landing gear on an aircraft. Skill is the use of knowledge to take some action, e.g., to operate the landing gear properly in simulation. Ability is the application of knowledge and/or skill to operate properly in a more complex mission scenario, such as in a simulation using the knowledge and skill.

A variety of techniques may be employed to determine KSA values for the trainee. For instance, the assessment module 15 can assess the trainee based on frequency of errors and correct actions in a simulation exercise, with corresponding weighting from severe errors at −5 to perfect operation at +5. Assessment can also be based on the trainee's visual scan pattern using techniques such as Hidden Markov Model (HMM) to assess the trainee's skill level while executing tasks. Interactive quizzes or pop-up questions may also be employed, where the response is either a verbal response picked up by a microphone or selection of a multiple choice question response through some other input device such as a touchscreen. Some biometrics may be used as well.

The KSA assessments made by the continuous assessment module 15 are stored as data in a student state data area in a database accessible to both the continuous assessment module 9 and the IDME 7. It will be understood that the student state data may be numerical values linked to identify the associated area of knowledge, skill or ability, and may be a flag of 1 or 0 indicative of the presence or absence in the student of the knowledge, skill or ability, or a numerical variable in a range that is indicative of the degree of presence of the KSA quality, e.g., a score from a test on a scale of 0 to 100, or may be a string of characters that is indicative of some level of KSA or expertise of the student, e.g., with respect to successful completion of some aspect of training, a "YES" or "NO", or a detailed definition of a familiarity with an instructional area, any character string, e.g., "BEGINNER", "EXPERT", or "BASIC", etc.

Also stored in the shared database area is platform state data that defines the current state of the platform, and is indicative of what training is being displayed or the status of the delivery of training to the trainee on the immersive station 3. This data may also be numerical or character strings.

Generally, the rules of the IDME define conditions for action that are based on the student state data or the platform data. The rules cause the system to react to the data produced by the continuous assessment so that the immediate decision making of the system improves the efficacy and efficiency of the use of the simulation device or immersive station 3.

Figure 3:
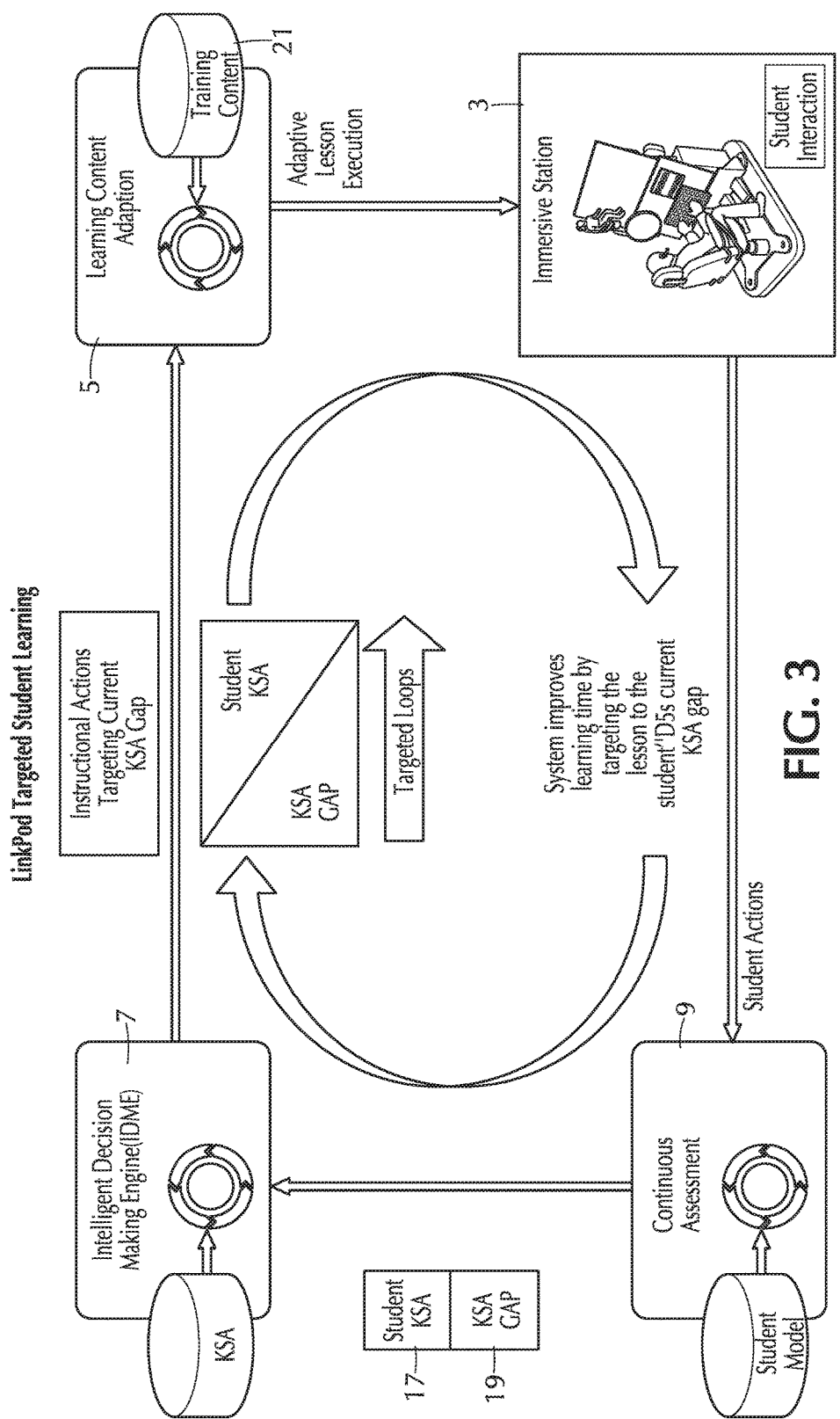
FIG. 3 is a more detailed schematic view of the operation of the computerized simulation system of the invention.

Referring to FIG. 3, a more detailed illustration of the operation of the system is shown. As described above, immersive station 3 is occupied by a student that interacts with the immersive station 3. Student actions at the immersive station 3 are processed by continuously-running assessment program 9. The assessment program continuously or continually develops an assessment of the knowledge, skill and ability (KSA) of the student from the student actions, and also from the stored LMS model of the student, which has already been obtained or supplied to the system or developed over time to derive, and defines certain training attributes of the trainee, such as whether the trainee is better trained by visual or auditory instruction.

From all of these inputs or student actions, the continuous assessment determines the student KSA 17. The student KSA is compared to a desired or required level of KSA appropriate to the level of instruction or simulation that the student is receiving. The difference between the desired KSA value and the actual student KSA may be referred to as a KSA gap 19, this being either a quantified value or a value that can be derived from the determined student KSA and compared with the specific expectations of the student as pre-determined by data in the system.

The student KSA is part of the student state data that is available to the IDME 7, and as such the rules are preferably written so as to take instructional actions targeting the current KSA gap of the trainee. As has been stated above, the IDME rules operate continuously, and they take instructional actions immediately based on the data in reaction to the KSA gap or KSA values, providing optimal training directed at the areas where the trainee requires instruction.

The instructional actions are sent from the IDME 7 to the learning content adaptation module 5. The learning content adaptation module 5 accesses training content data stored on a computer accessible data storage device 21 and this material is transmitted to the immersive station 3, adjusting the training of the trainee.

A rule is composed of an if portion and a then portion. The if portion of a rule is a series of patterns which specify the data that cause the rule to be applicable. Commonly, as is known in the art, the pattern that is satisfied is a Boolean or mathematical condition, e.g., if x=0, or if x=1, y=1 and z<50, or student_level=EXPERT, that is either present in the data or absent. The then portion of a rule is the set of actions to be executed when the rule is applicable, i.e., when the if portion of the rule is present in the database.

The inference engine or IDME 7 automatically matches data against predetermined patterns and determines which rules are applicable. The if portion of a rule is actually a whenever portion of a rule, because pattern matching occurs whenever changes are made to the data associated with the IDME. The inference engine selects a rule, and if the data conditions of the if portion are present in the data, then the actions of the then portion of the selected rule are executed. The inference engine then selects another rule and executes its actions. This process continues until no applicable rules remain.

The if portion, or the contingent data precondition portion, of each of the rules may be any aspect of the data student state or the platform state. The then portion of the rule may include action to be taken in response to the satisfaction of the conditional requirement for the student or platform data may be any action that can be done by the immersive station 3.

Figure 6:
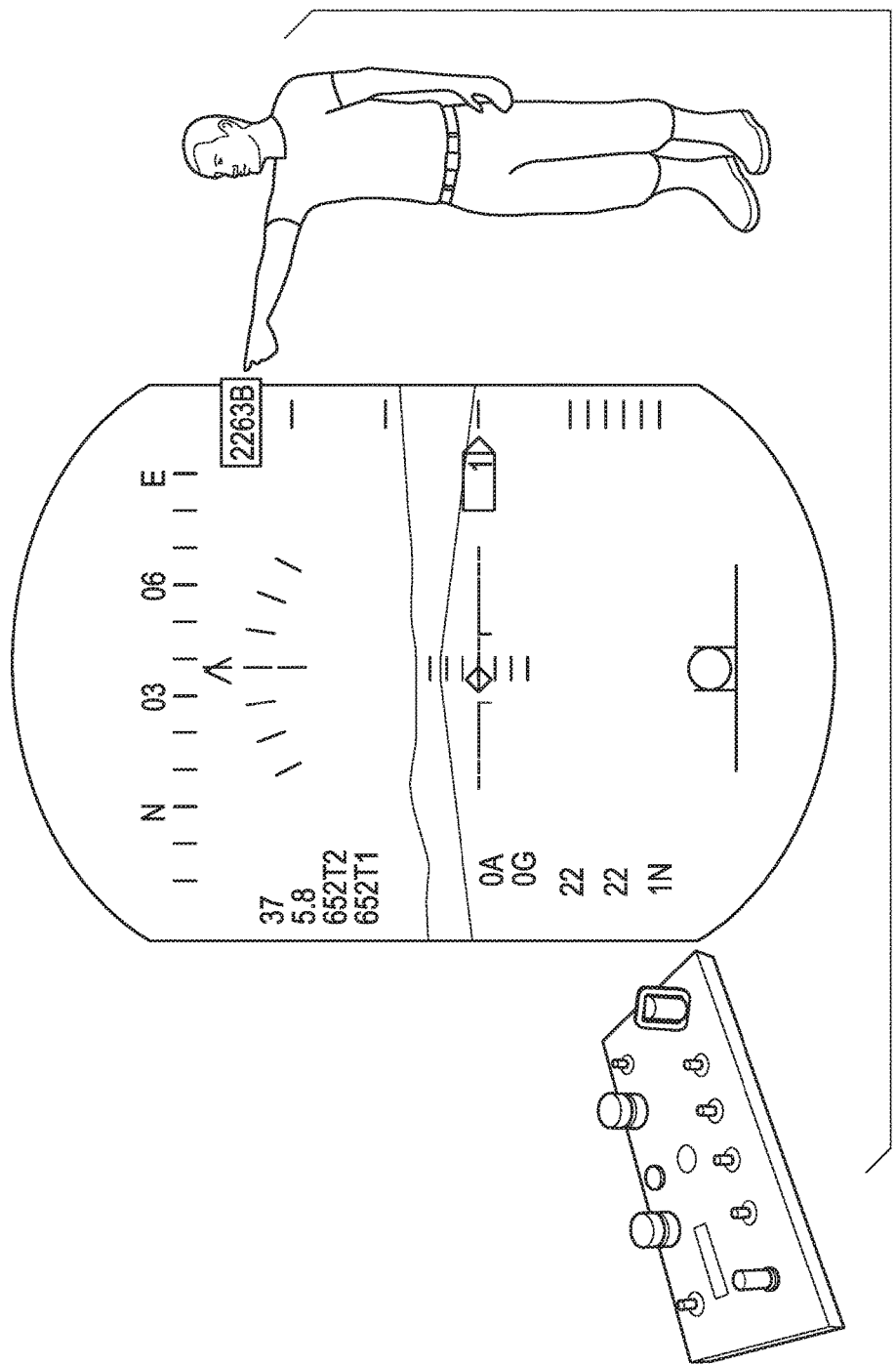
FIG. 6 is an exemplary display showing an avatar, and some training field of view and equipment presented to a trainee as an example.

For example, the IDME may be programmed with a rule that if the student KSA determined during a simulated aircraft training exercise indicates a poor understanding (either by a flag or a scale of effectiveness that is below a predetermined threshold) of an aspect of the operation of an instrument panel, e.g., an altimeter, then a special avatar is to be displayed and a an instructional statement made via the sound system of the immersive system 3. In case the current KSA data corresponds to such a flag or falls below the threshold, indicating a shortfall of the trainee's KSA, the instruction is transmitted to the learning content adaption 5 directing display of the avatar and playing of the audio. The required video and audio is located in the training content database 21, and the LCA 5 transmits it to the immersive station platform, where it is displayed or played to the trainee. FIG. 6 shows a main display screen view, wherein a human-appearing avatar is giving audio instruction regarding an aspect of flight training.

The avatar may be displayed as part of the rendered imagery shown to the trainee, e.g., as a person standing in the environment displayed and speaking to the trainee. Moreover, the rules-based system can make the avatar interactive with the trainee, responding to the trainee's reactions to the avatar's statements or commands.

For another example, the IDME may have a rule that if the eye tracker data indicates that the trainee has not blinked for thirty seconds, then the LCA is to schedule a break or discontinue the process and request assistance from the human trainer.

The then portion or action specified by the rules to a KSA deficiency relative to an acceptable KSA level may be as simple as repeating a previous course of instruction when a trainee shows a lack of proficiency in one particular area. On the other hand, the action may involve an immediate modification of the training presently being given to the trainee so as to enhance certain aspects of the training so as to offset a shortfall in training that is detected.

Another possible rule is one wherein the if portion of the rule is that the data indicates that the trainee is doing extremely well, has very high performance assessment and a low or zero KSA gap, possibly coupled with a biometric data having an indication of physiological effects of low stress or disinterest, such as blinking longer than usual, then additional complexity or difficulty is introduced into the ongoing training.

The internal software-based computer architecture of an embodiment of the system is illustrated in the diagram of FIG. 1. The host computer system generally indicated at 23 supports the operation of the training station 3, and preferably is connected via a network, e.g., the Internet, with the computer system that supports the LMS 5, allowing for the individual trainee to sign in, be recognized by the system, and to have his personal data, if on file, restored to the local system(s) of the training station 3 to assist in his training.

The host interface 25 also provides interface of the training station 3 to external simulation state data, and allows training station 3 interactions to be applied to an external simulation, i.e., a simulation program running on a connected computer system. For example, when a student turns on power to a virtual HUD by touching one of the touch screens of training station 3, this action generates an input signal that is communicated to the connected simulation. Responsive to the input, the simulation changes the switch position in the HUD, and the data defining the switch state in the simulation data base, and the power lamp changes color. The new state is communicated through host interface 25 to the virtual learning object (VLO), meaning the display in the training station 3, e.g., one of the touch displays, that is configured by the lesson data to look like a HUD control. The VLO changes the displayed appearance of the virtual device, e.g., the HUD, to match the host state data for the simulation of the device.

One or more processors in the training station administer the operation of the training platform, which is initiated with all programs and data needed for the selected course of instruction. The platform state data 33 is initialized and made available to the IDME 7, which accesses both the platform state data and the student state model data. The platform state 29 indicates the state of operation of the simulator attached to the system, and the student state model 35 reflects just data that has been stored based on the student's conduct and prior history as a trainee. Together these two groups of data are treated as "facts", the data to which the rules of the CLIPS inference engine 31 are applied.

The output of the IDME 7 (if any is indicated by the rules) is actions 39 that are transmitted to the LCA, the learning content adaptation service. These actions 39 are usually data that is transmitted to the learning content adaptation system 9, which in turn accesses the lesson database 41 accessible to the LinkPod™ core computer so that it can automatically obtain data stored therein. The LCA 9 transmits to the immersive platform service tasks that are to be executed by the simulator platform system, including avatar tasks, and other platform tasks for display or interaction with the trainee. This includes directing rendering of 3D imagery by an image generator computer system based on a database of virtual environment data, including models of vehicles and other objects, textures, and other aspects of display or presentation such as fonts and VOF. Data is returned from the simulation platform in a raw form, and that data is then processed to be converted into student state data or platform state data and stored in the relevant data areas for access by the IDME 7.

Figure 11:
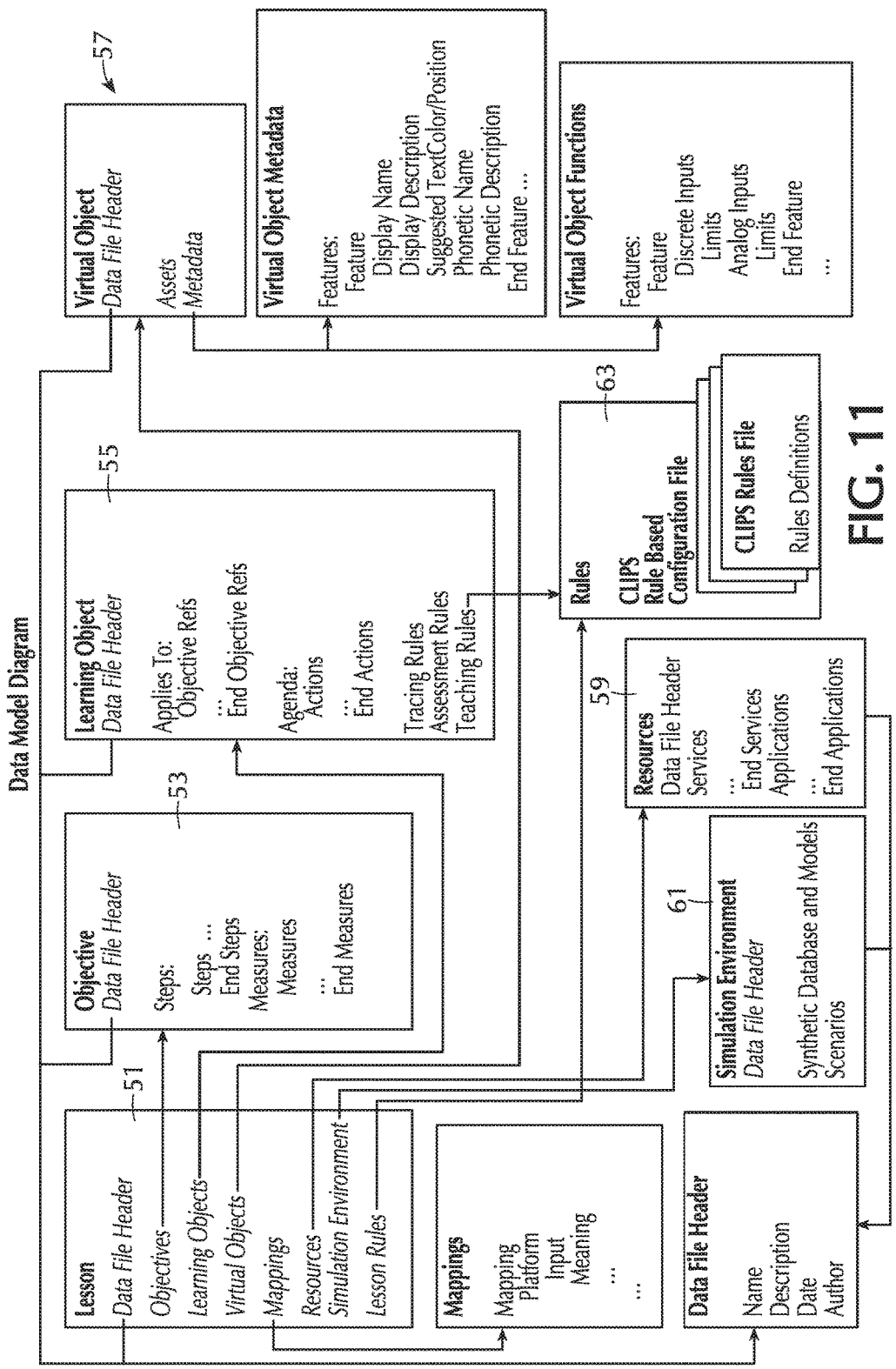
FIG. 11 is a diagram of a data model by which the data is stored in a computer accessible memory device.

FIG. 11 shows a diagram of the data model according to which data for the learning management system is preferably stored and utilized within the system of the invention. All of the elements and objects shown herein constitute data stored electronically on data storage devices that are accessible by a computer. The data model illustrates the organization of the stored data in the database, and is reflected in the database by stored database organizational data, e.g., pointers pointing to the location of data corresponding to records, which is used by software accessing the database to retrieve or store data therein on the data storage device or devices containing the database, as is well known in the art.

The LMS 5 identifies each course of instruction as a lesson record. The lesson record contains pointers or lists that include a set of objectives of the lesson, a set of learning objects of the lesson;

a set of virtual objects of the lesson; a set of mappings for the lesson;

a set of resources for the lesson;

an identification of a simulation environment for the lesson; and the lesson rules to be loaded into the IDME for the lesson.

The objectives are each stored as a record 53 with a list of steps to be performed by the trainee in the process of the lesson. These are each a discrete action, such as "identify landing gear control", and they can be satisfied by a test question given to the trainee. In addition to the identification of the steps, there are a set of measurements of effectiveness of completion of the steps by the trainee, either a flag set to 1 (completed) or 0 (not completed), or a range of effectiveness of the step completion.

The learning objects are each stored as a record 55 that defines a series of actions to be taken, i.e., displays of imagery or avatars or administration of tests, generally all outputs to the trainee through the immersive system.

The virtual objects are records 57 that define virtual controls, such as cockpit controls that are displayed in interactive viewing displays 8 so as to appear similar to the controls of the real vehicle that is being simulated.

The resources are identified as a data record 59 that lists the hardware of the immersive station that is to be used in the lesson, e.g., whether the microphone and voice recognition is to be employed, whether the eye tracking system is to be employed, etc.

The simulation environment record 61 identifies a specific database of scene data defining a virtual world that is used for the given lesson. There may be a large number of virtual environments defined in the system, such as mountains, desert, oceans, each of which may be selected by a lesson for use as the training mission environment.

The rules record 63 contains the set of rules for the lesson 51, written in CLIPS language. These rules are loaded into the IDME when the lesson is started. Individual learning object records may also reference rules records 55 as well, which are loaded when the learning object is loaded, and deleted from the IDME when the learning object is completed.

Figure 7:
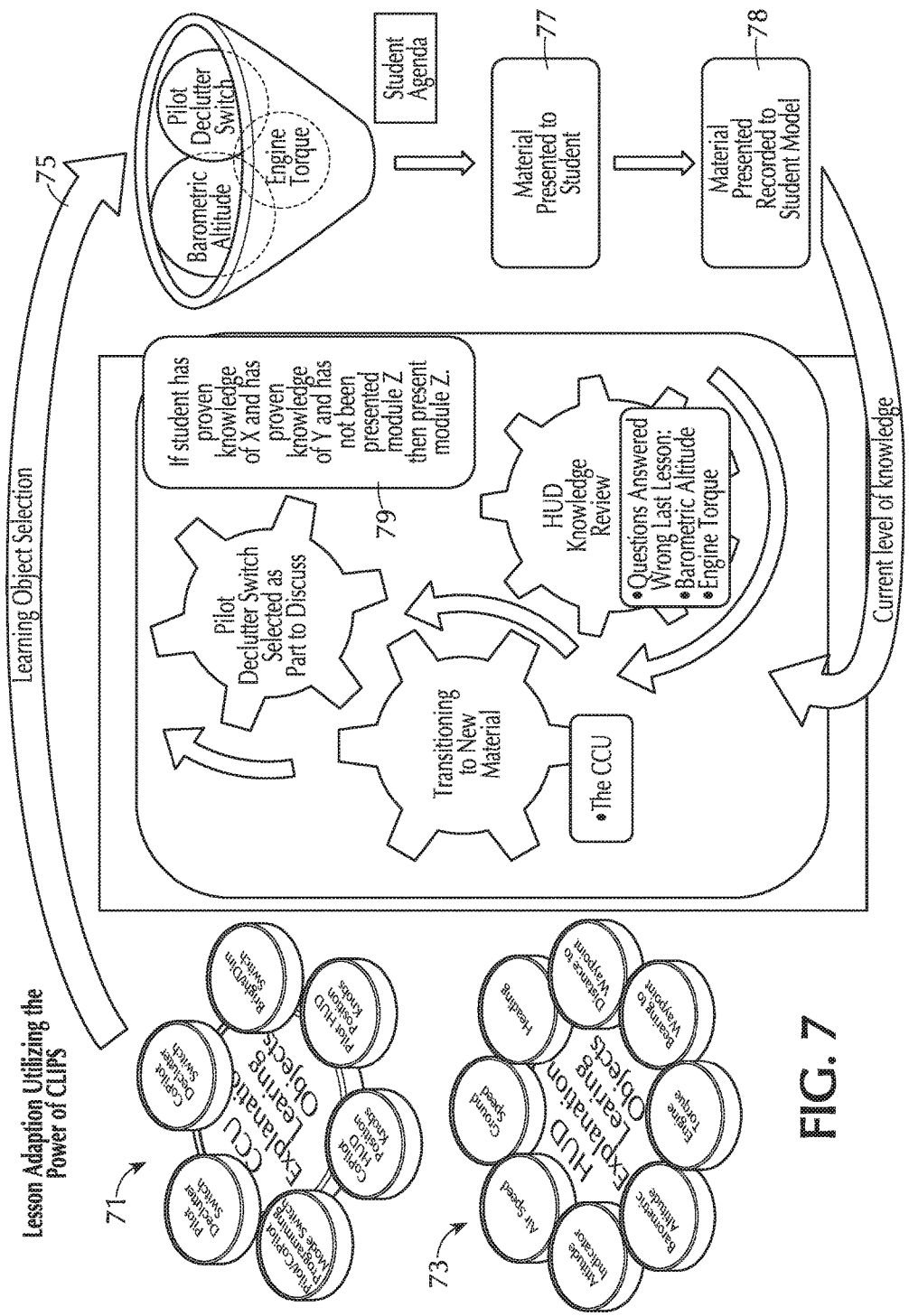
FIG. 7 is an illustrated diagram of the operation of a rules engine to administer a training program for the HUD (Head-Up Display) and CCU (Cockpit Control Unit) of a vehicle.

FIG. 7 illustrates a simple rule based process of training in which a lesson involving training in learning objects 71 having to do with operation of the CCU of an aircraft and learning objects having to do with HUD operation of the aircraft are combined.

Learning objects for the training are selected, step 75, based on student state data at startup, i.e., the level of training or skill of the student according to the LMS records. The general rules are loaded, and the set of learning objects are loaded. The rules control the presentation of the learning objects to the student so that a student will not be given a more advanced lesson until the student has completed the necessary prerequisites. The order of completing those prerequisites may vary from student to student, but the rule will not permit the display of the advanced learning object until the student state data indicates that the prerequisite learning objects have been completed.

As seen in FIG. 7, an agenda of learning objects is selected for the student, and the rules cause them to be presented to the student (step 77), and once the material has been presented to the student, the student state model data is updated to reflect the fact (step 78). Based on the initial run and an assessment of the student knowledge level, a rule 79 is applied to the extant student state data: "IF (1) student has proven knowledge of X, and (2) student has proven knowledge of Y, and (3) student has not yet been presented module Z (another learning object), THEN present module Z" as reflected by values stored in the student state data. This rule is active, but its IF-part is not satisfied until the student state data indicates that the student has knowledge of X and Y. When the student state data indicates that the student has knowledge of X and knowledge of Y, then at that point in time, the rule causes Z to be presented. Once presented, the student model or student state data is updated to reflect that Z has been presented, as by, e.g., setting data as a flag corresponding to completion of the Z module. After this, the student model or data indicates that Z has been presented, and the IF-part of the rule, which includes the determination "(3) student has not yet been presented module Z" is not satisfied, and the rule does not cause any action from then on.

Figure 8:
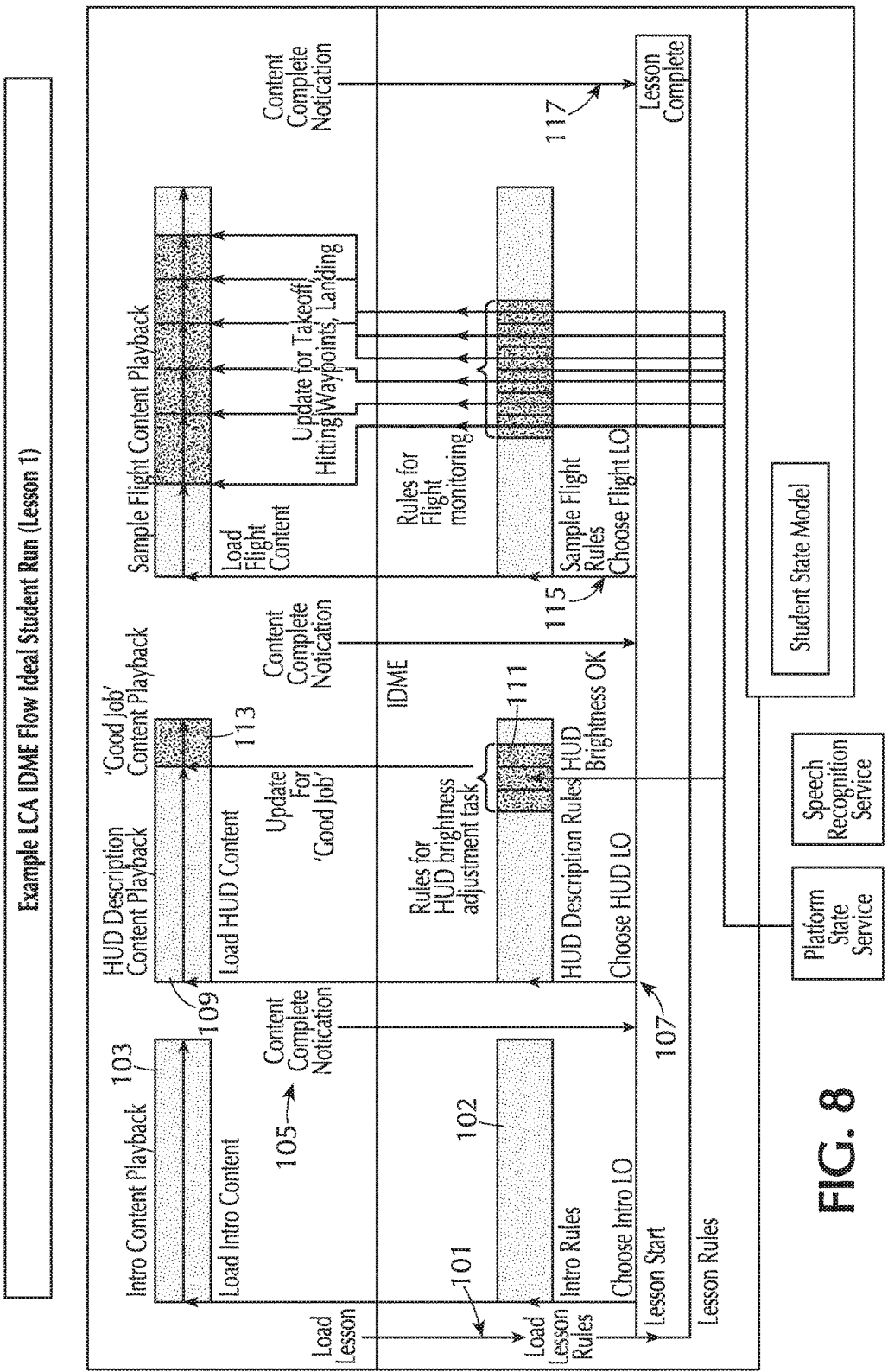
FIG. 8 shows a diagram of a timeline of training of an ideal student using the training system of the present invention.

FIG. 8 shows a timeline flow for a lesson as applied to a student that is an ideal student, meaning that the student completes the objectives of each learning object without creating conditions in the student state data that cause the IDME rules to trigger remedial actions.

At the beginning 101 of the timeline, the lesson is loaded, and this includes loading of the lesson rules. The lesson starts, and the first rule to activate is the Intro Rules 102, which trigger the action of Intro Content Playback 103. When the intro is completed, this rule is not satisfied by the data because a flag or content complete for the intro learning object ("LO") is set at 105. The HUD LO Description Rules 108 then are satisfied and become active, the action being to load the HUD content and play the HUD playback 109. When that is completed, the HUD rules direct an adjustment task for the student to perform at 111. This task is successfully completed and the HUD rules then direct playback of a "good job" message (113) to the student. When all of these actions are completed, flags so indicating are set in the student model data, and the HUD description rules are no longer satisfied and become inactive. At that point 115, sample flight LO rules become active, and the rules are satisfied and run through to successful completion at 117.

Figure 9:
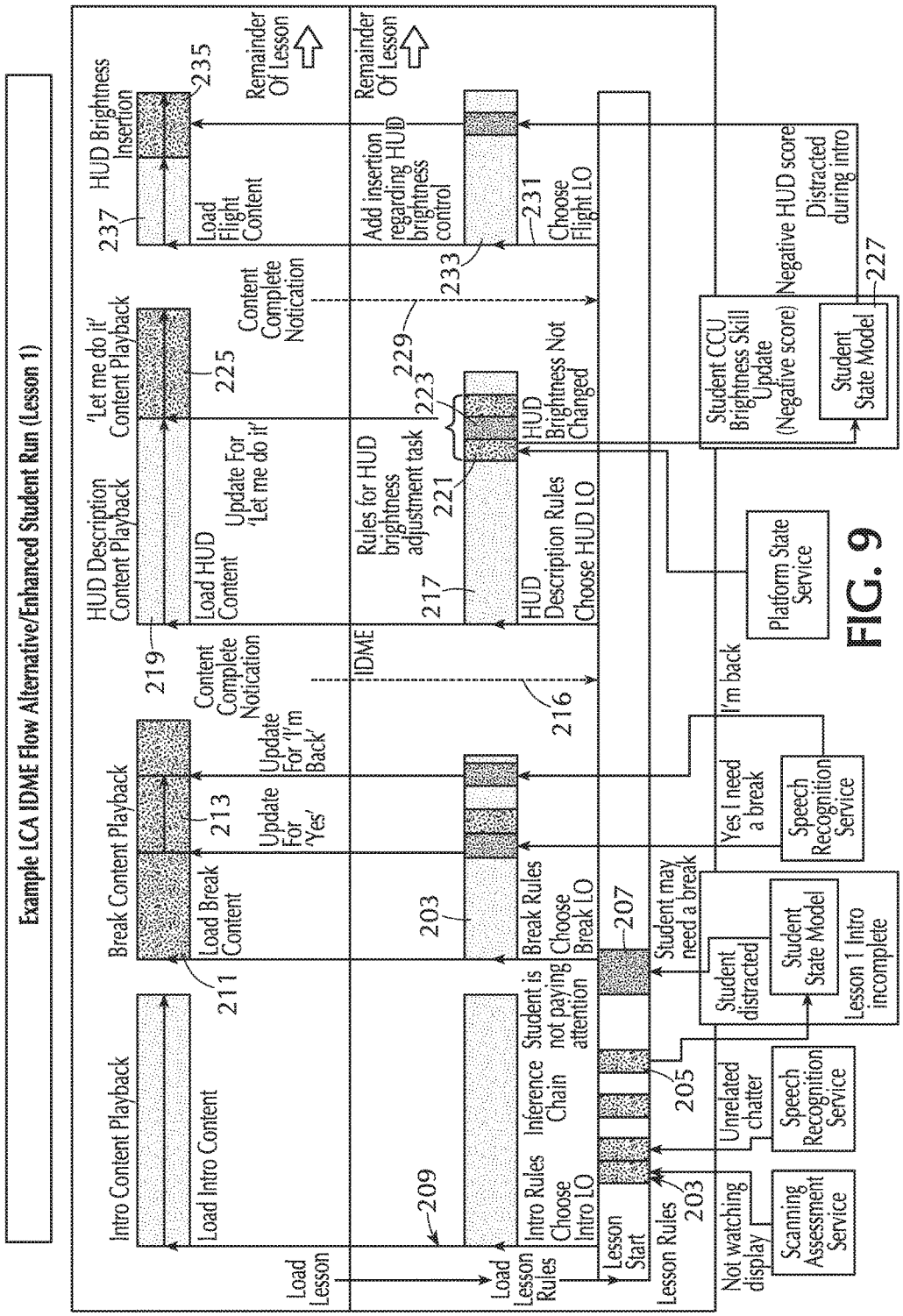
FIG. 9 is a timeline diagram of a student requiring corrective or remedial actions being trained in this same material as in FIG. 8.

FIG. 9 shows a different outcome based on the same rules, all of which are loaded at point 201. The rules include eye-tracker data based rules that react to data indicative of the student not watching display, and of microphone pickup of chatter indicative of distraction.

The Intro LO is loaded, and the intro content playback proceeds. In addition to the intro rule, the distraction detection rule is running as well. When the student data indicates that the student is not watching the display (203) and there is chatter from the microphone (205), the distraction rule triggers a break-offer action 207. The break is conducted according to Break Rules 209, which involve playback 211 offering a break, listening (213) for an acceptance, and then resuming on return of the student (215). The intro completion flag is then set at point 216.

The HUD LO then starts according to the HUD description rules 217. There is the HUD content playback 219, followed by a test of HUD brightness adjustment 221. The student here does not properly change the HUD brightness (223), and the rules cause playback of the system itself doing the brightness adjustment (225). A negative effectiveness data value is then stored in the student state data (227).

The HUD rules actions are completed at 229, and the HUD rules become inactive. The rules then load the Flight LO at point 231 with the Flight LO rules 233. The flight content is then run, but there is an active rule that has its if portion satisfied—(1) the student has a negative HUD score, and (2) if the student data indicates distraction during the intro playback, THEN an action is directed that a HUD brightness training event insertion (235) is made in the flight LO content 237. Once that is completed, the lesson continues as before.

The remedial action taken in this way using the rules engine avoids failure of the entire lesson effectiveness, because corrective action is taken during the lesson to correct for the distraction and knowledge deficiency detected in the student. The result is more efficient use of the simulation system.

Figure 12:
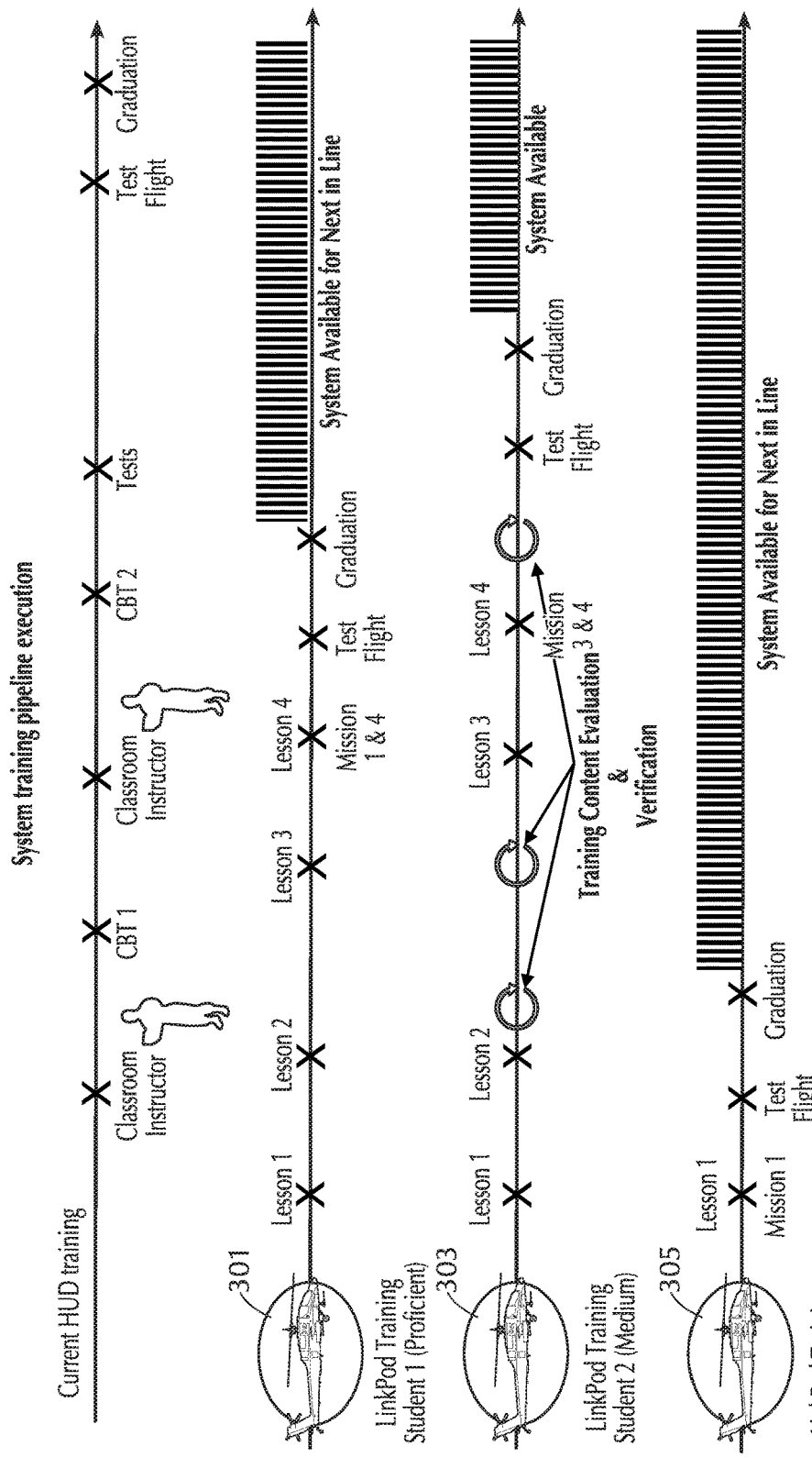
FIG. 12 is a diagram illustrating the relative efficiencies of training for a number of different students at different skill levels.

Efficiency of the rules-based approach is also illustrated in the comparative timelines of FIG. 12. A proficient student timeline is seen at 301. The proficient student completes four lessons, and his proficiency is detected by rules-based assessment. He then completes two missions 1 and 4 appropriate to his KSA level, completes a test flight and then graduates, freeing the system for the next trainee.

The timeline 303 for student 2, of medium ability shows the same four lessons, with additional training content inserted throughout, resulting in a test fight and graduation in slightly longer time than required for the proficient student, but not equivalent to repetition of the course.

The timeline 305 for an expert student is greatly accelerated, because the training is intensified as the rules detect a high level of KSA, resulting in a mission and a test flight after only one lesson, and immediate graduation. This fees the system for an appreciable amount of time, and does not waste the trainee's time in unnecessary training either.

Figure 13:
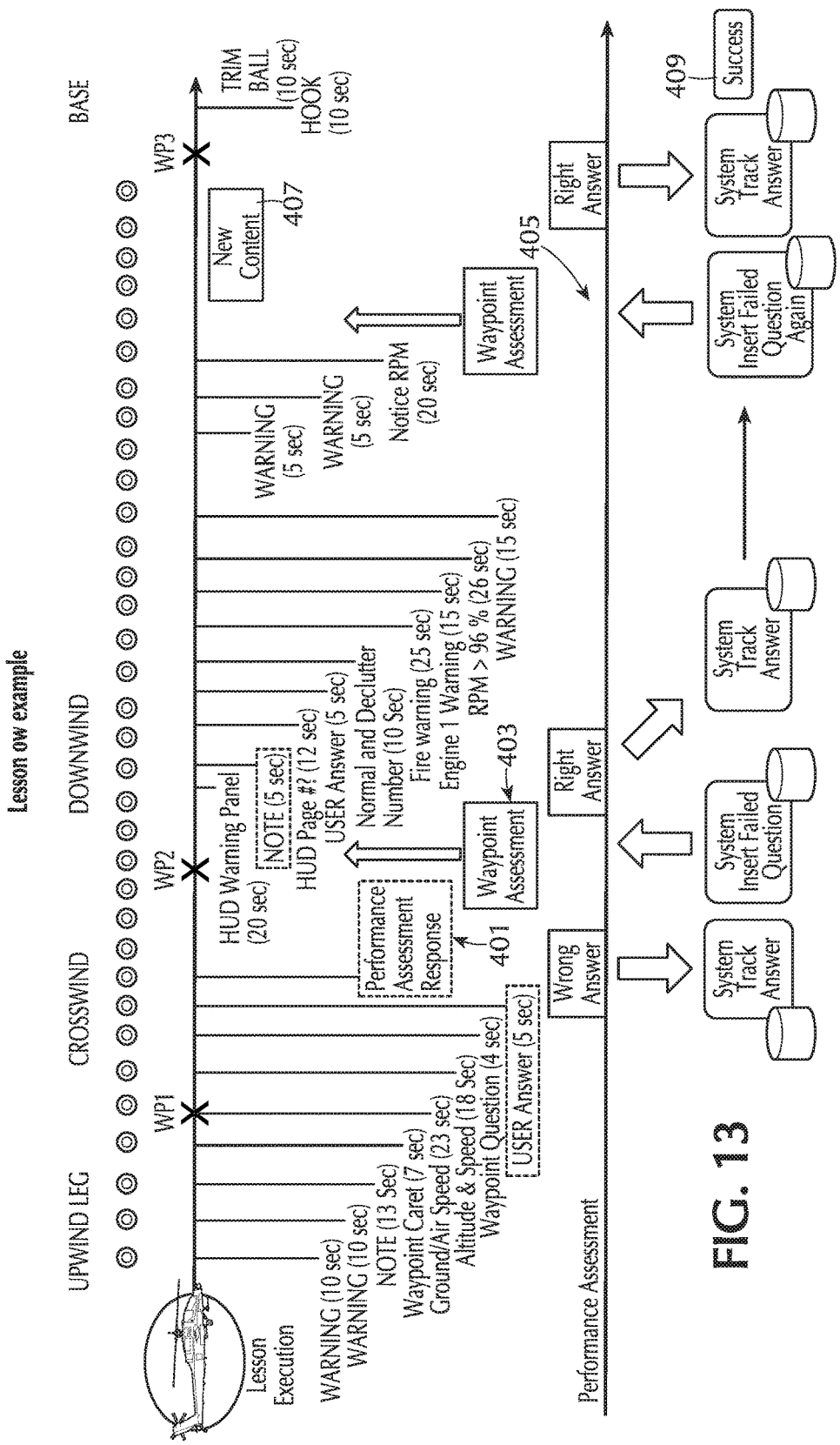
FIG. 13 is a diagram of an example showing lesson flow for an exemplary rules implementation.

FIG. 13 also illustrates flow of a lesson. The trainee in this scenario gives the wrong answer at assessment point 401. The student data is modified to have a flag indicative of the wrong answer. The question is re-asked at point 403, and the right answer is given. A running rule tests this question again at point 405, and when the wrong answer is given, new content 407 is inserted and displayed to the trainee. The right answer is then given at 409.

Figure 14:
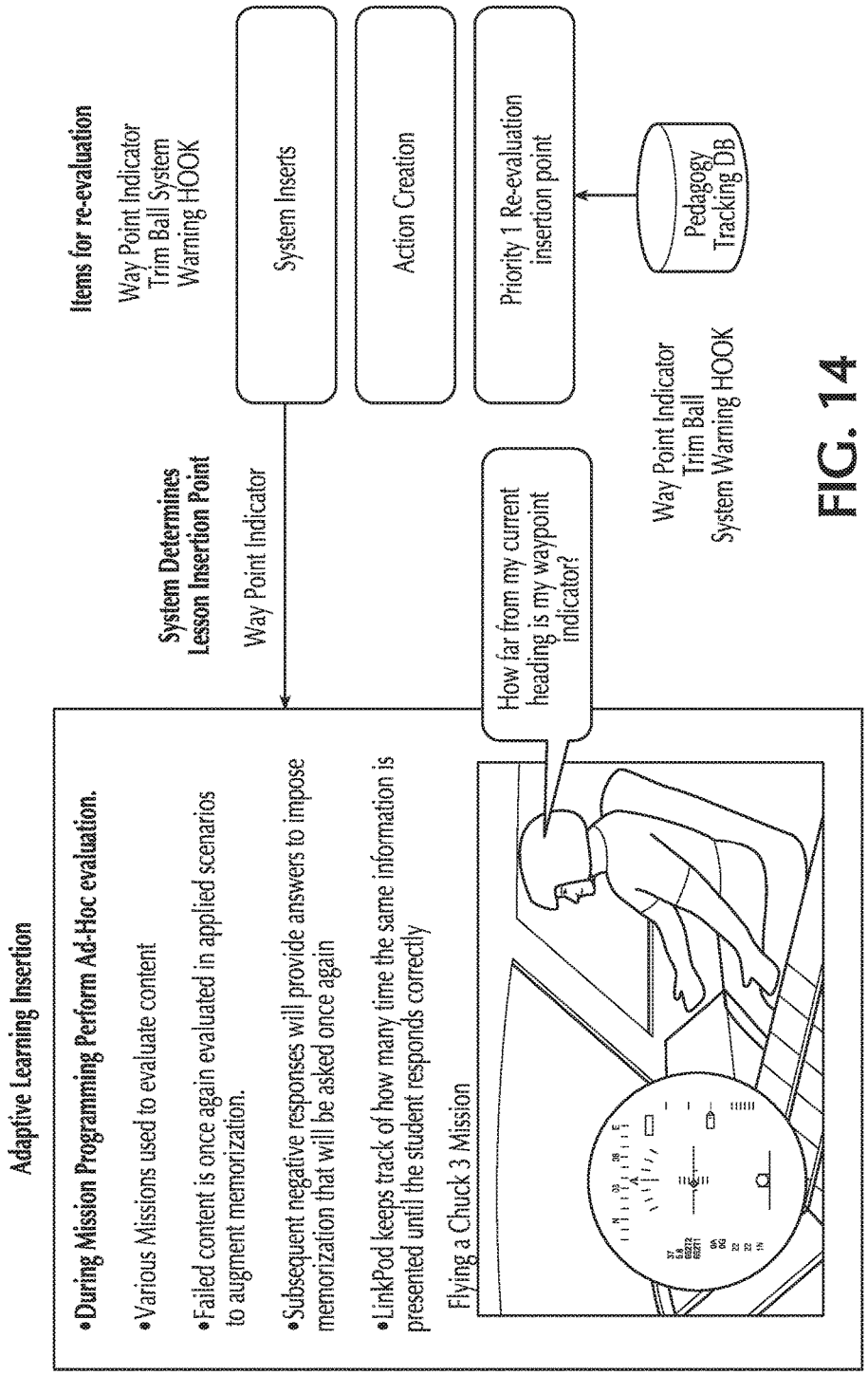
FIG. 14 is a diagram illustrating trainee insertion in the adaptive learning system of the present invention.
Figure 15:
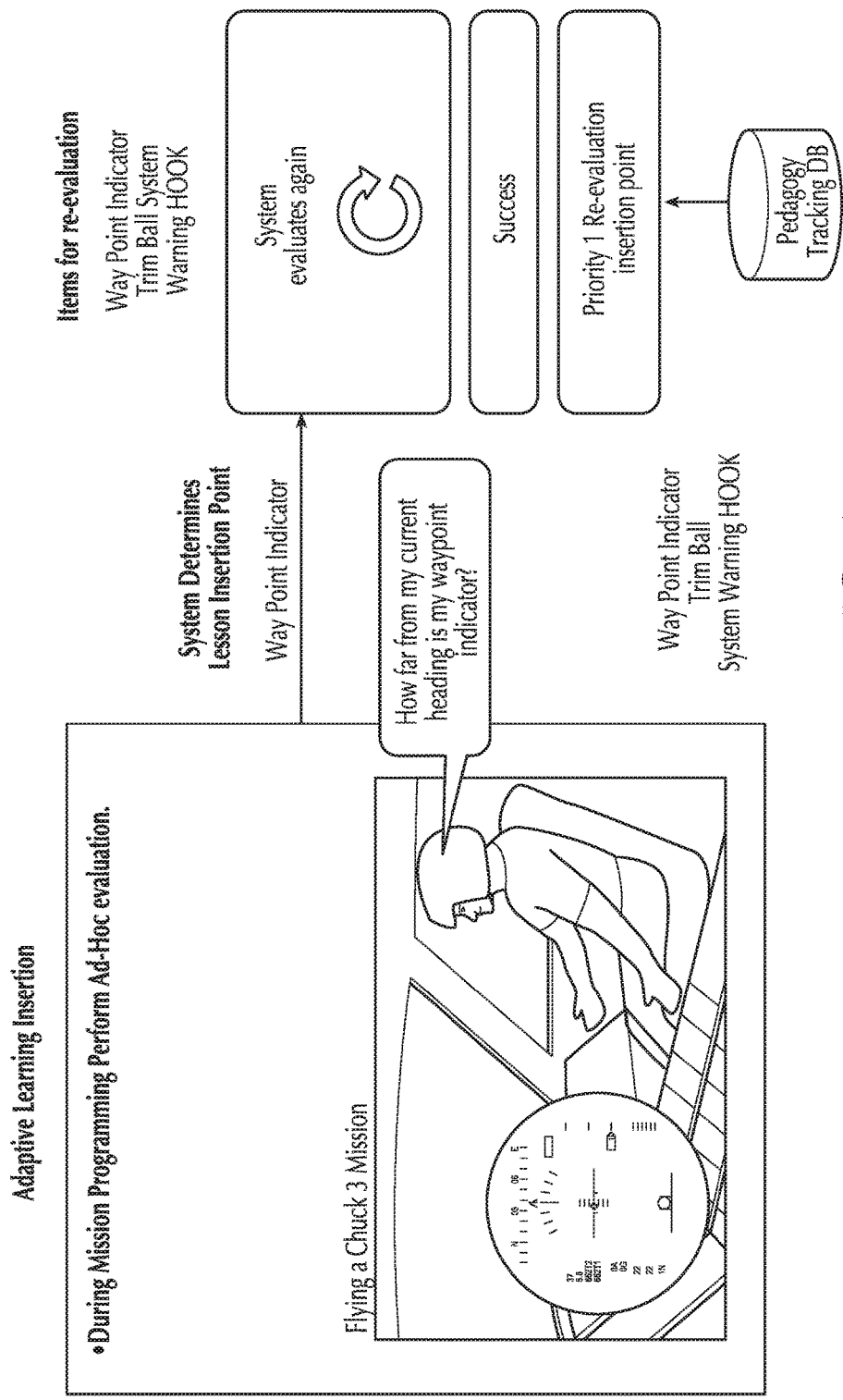
FIG. 15 is a diagram illustrating trainee re-evaluation in the adaptive learning system of the present invention.

This adaptive learning approach is described in FIGS. 14 and 15. The adaptive learning allows for both insertion and reevaluation. As listed in FIG. 14, various missions are run to evaluate the grasp of the content by the student. Failed content is inserted into the missions to augment memorization of the content by the student. Where questions are used to determine the retention of the information, the questions will be repeated to enhance memorization. The system preserves in the student state data the number of times the information has been presented to the student before the student answers the question correctly.

As described in FIG. 15, the failure to answer a question correctly can trigger a rule that an ad hoc evaluation of the content may be presented during a mission.

The rules engine architecture allows for this type of flexible training method. To obtain maximum efficiency, the rules must be developed and written in a way that identifies KSA parameters that are to be satisfied, and breaks the lessons up into workably discrete components that can be addressed independently to determine when the student has developed the requisite level of training KSA, and when he has not, to take remedial action immediately so as not to allow a partial deficiency to delay the entire training process.

Figure 10:
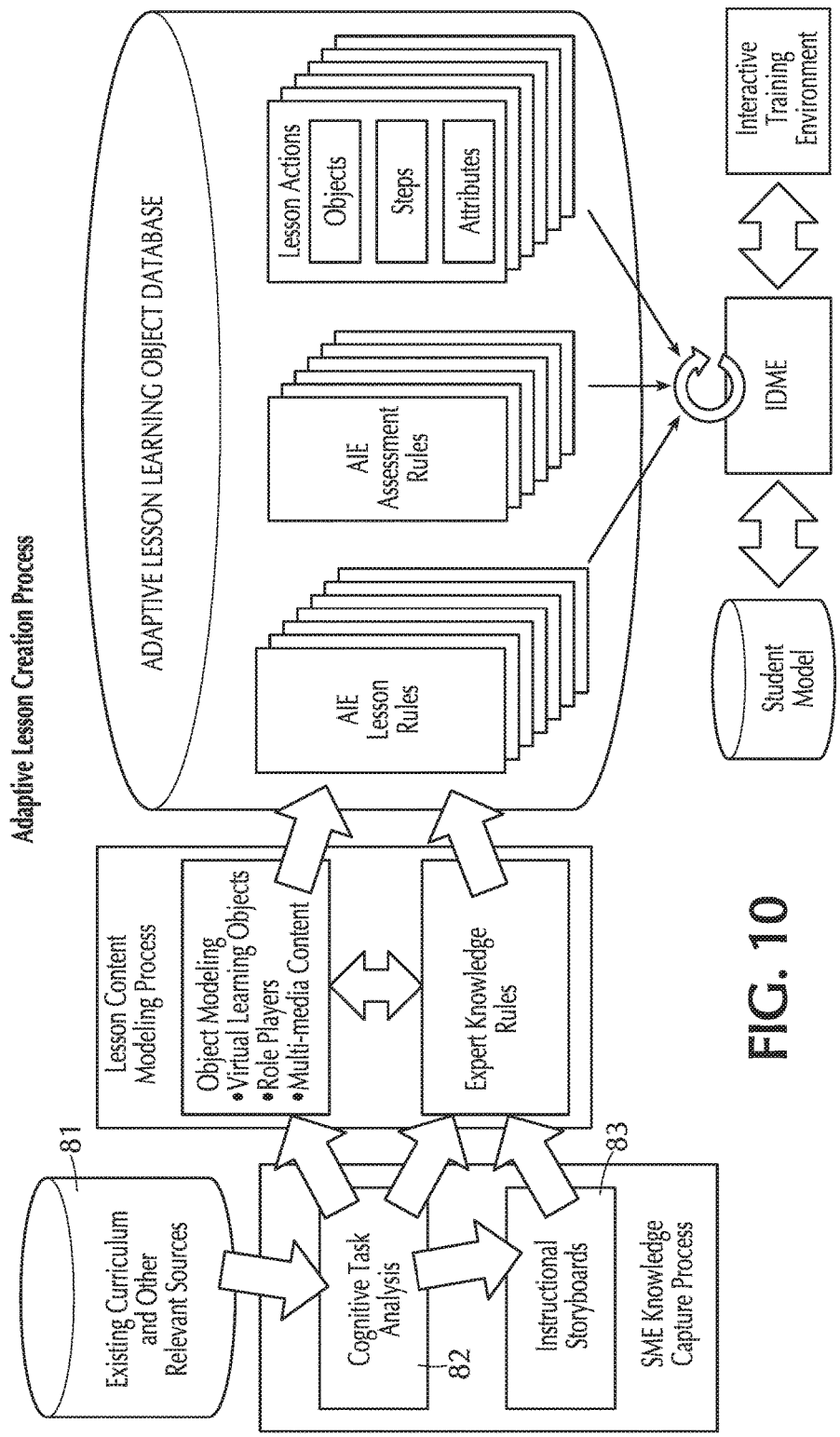
FIG. 10 is an illustration of the development of the learning object database used for the present training method.

FIG. 10 illustrates the process of creation of the rules for a lesson. An existing linear curriculum 81 is broken down by cognitive analysis (step 82) into instructional storyboards (83). The cognitive task analysis 82 and the instructional storyboards 83 are used to develop the expert knowledge rules, and also object modeling for the development of the learning object database for presenting the lesson to a trainee in a rules-based system. The rules of the learning object include lesson rules, which govern the content presented and its order of presentation. Assessment rules identify specific ways of determining KSA of the student, as well as other aspects of the student's state, such as distraction or boredom. The resulting rules are loaded into the IDME when the training is conducted.

Figure 16:
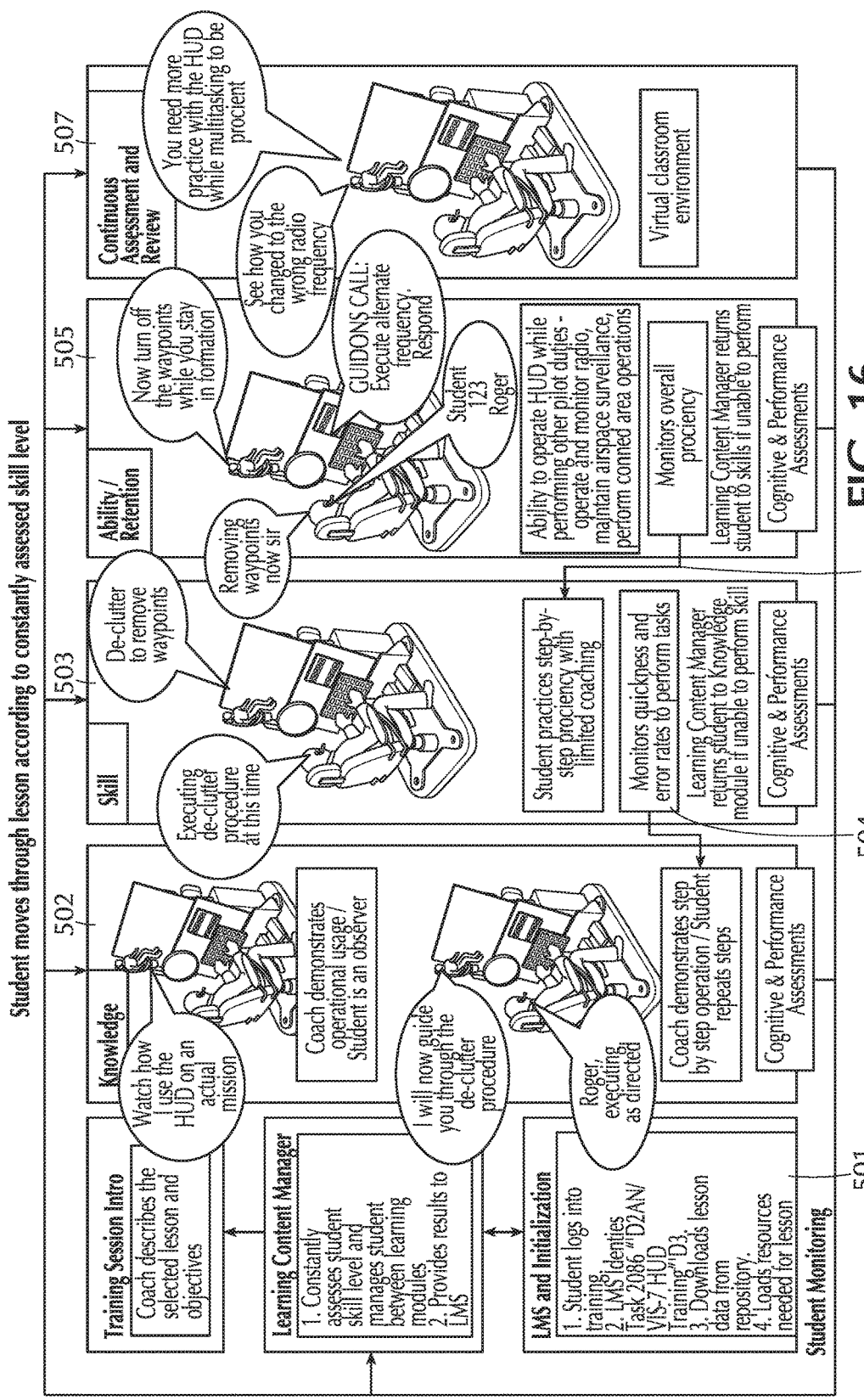
FIG. 16 shows a story board style illustration of the training process for a UH60 attack helicopter simulation, illustrating various rules-implemented processes possible according to the present invention.

A KSA storyboard example is shown in FIG. 16. The trainee logs in and starts the training via the LMS (step 501). The learning content manager (which includes the IDME, not shown) constantly assesses the student skill levels. The student is first given the knowledge of the lesson, in this case a HUD training exercise, by a virtual coach that performs the HUD usage and then directs the trainee through a declutter operation (stage 502). Once completed, skill is developed by reducing coaching in stage 503. If too slow or too prone to errors, the trainee is sent back to stage 501 for more knowledge training (step 504). If not, the trainee moves to stage 505 for ability and retention training. In this stage 505, a more complex mission using the knowledge and skill is presented to the trainee. If the trainee is not able to perform, the trainee is returned to stage 503 for further skill development. If the trainee is able to perform, further training on points of detected weakness can be given in stage 507.

The operation of the training method of FIG. 16 is based on rules that are continuously active. In particular, a rule is constantly in effect that is the determined level of skill falls below a predetermined threshold, the training action is then changed to a knowledge-type coach training as in stage 502. Similarly, a rule responsive to an assessment of ability falling below a predetermined threshold causes the training action of changing to a skill level training. The changes of training to different stages are immediate due to the constant applicability of the rules via the IDME. The result is efficient development of knowledge, skill and ability for the trainee.

Figure 17:
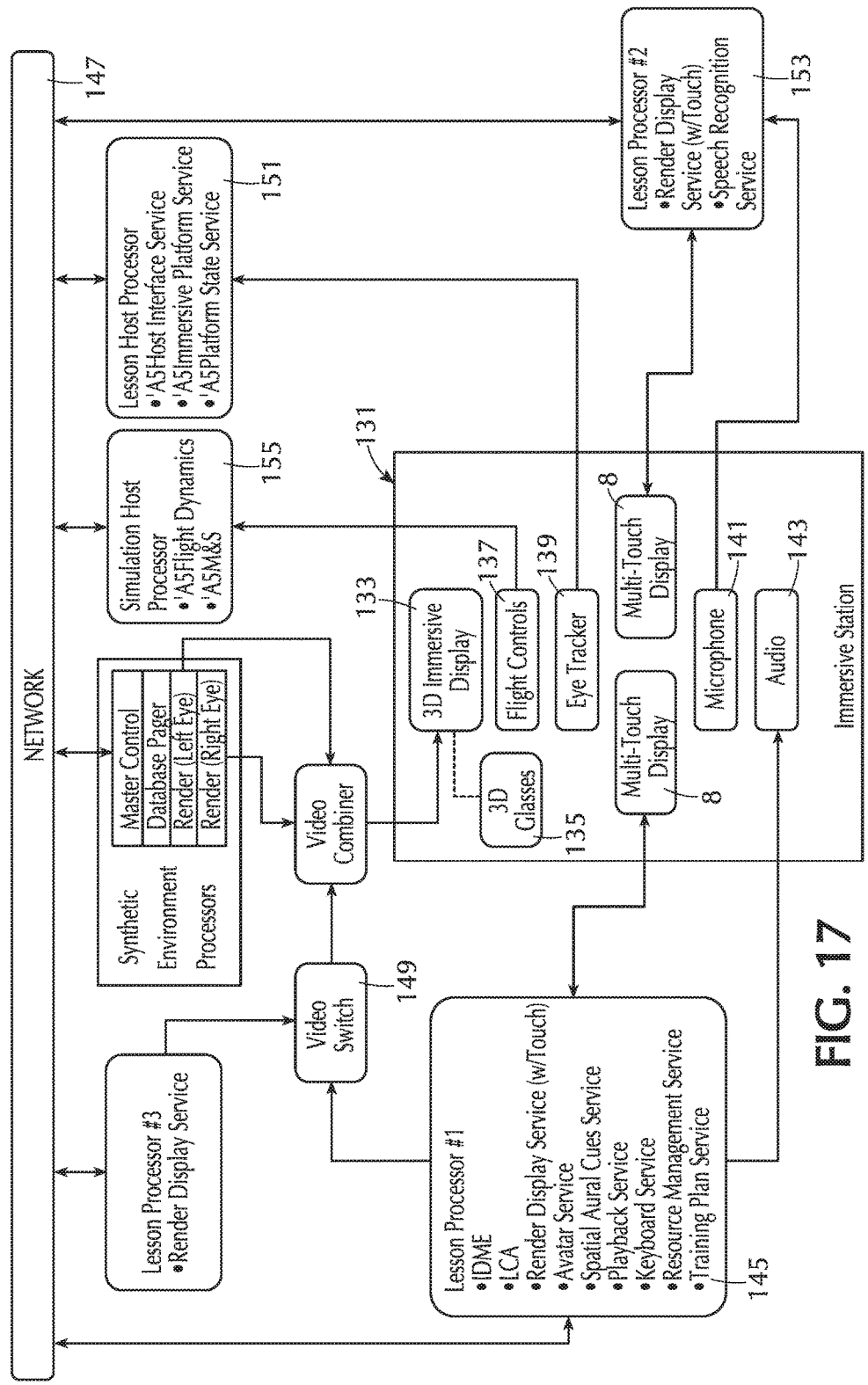
FIG. 17 is a diagram illustrating the structure of a multi-processor embodiment of the invention.

FIG. 17 illustrates the architecture of a preferred embodiment of a multiprocessor system supporting a LinkPod immersive training station 3. The station 3 includes the set 131 of I/O devices that interact with the trainee. These include a 3D immersive main display 133, cf. display 6 of FIG. 5, with associated 3D glasses 135 to be worn by the trainee. The I/O devices include also flight controls 137, which may be a joystick or a more elaborate cockpit control system that can emulate real vehicle controls, and left and right touch screens 8 that allow trainee input to the system and display appropriate media or VLOs to the trainee. The I/O devices also include an eye tracker 139 of the sort well known in the art of simulation and military aircraft, a microphone 141 that receives audio input from the trainee, and an audio system 143 that generates sound as required by the training process.

A computer lesson processor #1 (145) with access to a local data storage device and also access to a network 147, is connected directly with and transmits data and/or media to one touch display 8 and the audio system 143. It is also connected with video switch 149, which switches between video supplied from two possible sources, as will be described below. Lesson processor #1 supports execution of the software that supports the IDME and the LCA functions of the station 3. It also administers a number of services, i.e., the touch screen service, a service that displays an avatar instructor for the trainee to view, spatial audio service that can output specific sounds via audio system 143 as part of the training, playback of video or audio when appropriate, support for a keyboard of the system, and resource management and training plan services that operate as described above with respect to the IDME/LCA operation, obtaining, locally or via network 147 from the LMS, and implementing the various media or data needed for the training selected.

The operation of lesson processor #1 is initiated by lesson host processor 151, which is connected therewith by the network. Lesson host processor 151 supports the eye tracker 139, but also administers the immersive platform and maintains the data of the platform state, which is accessible to the IDME of lesson processor #1 locally or via the network. This host processor 151 assists the trainee in initially logging in and accesses over the network 147 the LCS system, identifying the trainee and selecting the lessons that are to be implemented. The rules, media, and other data needed for the identified training are then transmitted from the LCS system over network 147 and loaded into a data storage device accessible by lesson processor #1.

Lesson processor #1 communicates via network 147 with lesson processor #2 (153), which receives from processor #1 data directing what it should display on the associated touch display 8. Lesson processor #2 also receives data from speech recognition of input via microphone 141, which is incorporated into the platform state data accessible to the IDME.

An additional processor, simulation host processor 155 provides for vehicle simulation, i.e., it determines using a computer model and scene data as well as data of the platform state or student state how the vehicle is moving or operating. Data including the trainee ownership location in a virtual environment and other simulation data is output over the network to synthetic environment processors 157.

The synthetic environment processors 157 are essentially a multiprocessor image generator that renders an out-the-window view to be displayed to the trainee. This view includes distinct 3D imagery for the left and right eyes of the trainee, which is sent through a video combiner 159 and displayed in 3D to the trainee on immersive display 133.

Lesson processor 1 accesses video switch 149 and selectively displays either the OTW imagery being rendered in real time by processors 157, or it transmits recorded video that is transmitted from lesson processor #3 (161). Lesson processor #3 outputs recorded video the training session does not provide for trainee changes in the video portion displayed of, e.g., a flight taking place where the trainee is a passenger or supportive technician in the simulation, working on different aspects of the vehicle operation. Time-stamped recorded video or live video may also be supplied and displayed in this way as well via lesson processor #3.

The network 147 links all the processors so that the IDME can implement its actions through those processors, and the entire environment acts as a stand-alone training module. Additional training materials and data may be accessed at the LMS system via the network at all times.

In addition, the IDME shown is supported on lesson processor 1. It has access to virtually all the data of the training station 3, including the data stored at the other processors, and rules implemented by the IDME may be based on the state of any of this data. Also, because the rules are in continuous effect, the IDME engine may be divided into distinct sets of rules each supported on a respective processor acting as a decision engine that has access to the platform and student data.

The training station may also be readily adapted to the training of two or more trainees at once. The rules of the IDME simply need to be configured to support this functionality. Separate assessments of KSA for each student based on the different inputs from e.g., different touch screens can also be made and rules-based actions taken in response to those KSA values.

The terms used herein should be viewed as terms of description rather than of limitation, as those who have skill in the art, with the specification before them, will be able to make modifications and variations thereto without departing from the spirit of the invention.

What is claimed is:

1. A computerized system for training a student, said system comprising:
    a simulation station configured to interact with the student, said simulation station displaying output to the student via at least one output device and receiving input via at least one input device;
    a computer system connected with the simulation station and having a rules engine operative thereon, having computer accessible data storage operatively associated therewith, and storing the following electronically accessible data:
    learning object data comprising a plurality of learning objects each configured to provide interaction with the student at the simulation system so as to train the student, and
    rule data defining a plurality of rules accessed by the rules engine, said rules data including, for each rule, respective if-portion data defining a condition of data and then-portion data defining an action that the rules engine causes to be performed at the simulation station when the condition of data of the if-portion is satisfied,
    for at least some of said rules, the respective action comprising output of a respective one of the learning objects so as to interact with the student; and
    said rules engine being continuously active such that when the condition of data of any of the if-portions of the rules becomes present in the data storage the computer system performs the action of the then-portion thereof substantially immediately;
    wherein the data storage stores student state data including training assessment data that is indicative of a current training level of the student;
    said rules being configured to cause the simulation station to present, based on the student state data, a course of training comprising a series of said learning objects presented to the student at the simulation station;
    wherein the computerized system updates the training assessment data of the student in real time during the course of training as the learning objects thereof are presented to the student, and based on one or more inputs of the student to the simulation station; and
    wherein the rule data includes remedial rule data defining a plurality of remedial rules,
    wherein each remedial rule has a respective if-portion and a respective then-portion;
    wherein the if-portion of each of said remedial rules has a data condition that causes execution of the then-portion thereof when the training assessment data of the student indicates a KSA gap in the current training level of the student, and the then-portion of the remedial rule substantially immediately causes the computer system to perform an action that causes output of a remedial training learning object to the student at the simulation station; and
    wherein the remedial training learning object is selected based on said KSA gap indicated by the training assessment data, and the remedial training learning object is configured to remediate the KSA gap, wherein, when the KSA gap is a gap in knowledge, the remedial training learning object is a knowledge-directed remedial learning object, wherein, when the KSA gap is a gap in skill, the remedial training learning object is a skill-directed remedial learning object, and wherein, when the KSA gap is a gap in ability, the remedial training learning object is an ability-directed remedial learning object.

2. The system according to claim 1,
wherein some of the learning objects each comprise respective training output data configured so as to provide a respective training output video displayed to the student at the simulation station on a display device or training output audio played to the student at the simulation station by a sound output device;
the student state data including data indicative of learning objects that have been output to the student, said data being updated on completion of output of the respective learning object; and
wherein the rule data defines at least one of said rules with a data condition that the data indicates that a first prerequisite of said learning objects has been output to the student, and an action that causes the simulation station to provide the training output data of another of said learning objects that is a second advanced learning object to the student.

3. The system according to claim 1,
wherein the training output data includes audio and video that is output through a display device and an audio sound system of the simulation station, and wherein the video includes a display of a human avatar and the audio includes a speaking voice of the avatar.

4. The system according to claim 1,
wherein the simulator station simulates a vehicle, and the rules initiate an action of one of the learning objects that output virtual data that is displayed on a screen in the simulation station so that the screen has the appearance of controls of the vehicle, and input can be entered by the student by touching the screen and interacting with the virtual controls thereby; and
wherein the rules also initiate an action of another learning object that causes the simulation station to display to the student an out-the-window view rendered in real time on a display screen of the simulator station corresponding to a simulated view from a calculated virtual location of the simulated vehicle in a virtual environment identified by the learning object data simulation initiated responsive to an action initiating the learning object.

5. The system according to claim 1,
wherein the student state data includes biometric data derived from monitoring the student with one or more input devices, and
wherein the rules include one or more biometric-based rules that initiate actions responsive to a data condition wherein the biometric data indicates circumstances that the student is due for a break, circumstances indicating that the student is not being presented with adequately difficult objectives for the student's training level, or circumstances that the student is being presented with objectives that are too difficult for the student's training level, and said actions include starting one of said learning objects, outputting a communication offering the student a break, or starting one or more of the learning objects that increase or reduce the difficulty of the training.

6. The system according to claim 5, wherein the biometric data is provided by an eye tracker, a microphone, a respiration sensor, sensors capable of detecting posture of the student, or one or more brain sensors.

7. The system according to claim 1,
wherein the computer system includes
a simulation-station computer located with the simulation station and connected with the input and output devices thereof, said simulation-station computer supporting the rules engine, said rules engine being configured to access data defining rules in CLIPS, the data storage including a local data storage device storing the learning object data, the rules data, the objective data, the student state data, and platform state data defining status of the operation of the simulation station for a lesson being given thereon; and
a computerized learning management system communicating over a network with the simulation-station computer, said learning management system having data storage storing lesson data, the lesson data including learning object data, objective data, and rules data for a plurality of lessons; and
a plurality of other computer systems each connected with the learning management system via the network and functioning as part of a respective simulation station having input and output devices for training a respective student;
said learning management system transmitting copies of lesson data for a selected lesson to each of the simulation stations.

8. The system according to claim 1, wherein the simulation station further comprises a haptic output device.

9. The system according to claim 1, wherein the rules data further includes data defining one or more training acceleration rules that each have a respective if-portion and a respective then-portion, wherein the if-portion has a respective data condition that the training assessment data indicates that the current training level of the student is at a sufficiently high KSA level to activate the acceleration rule, and the then-portion of the acceleration rule causes modification of the course of training by removing one or more of the learning objects therefrom, and shortens time required for the student for the course of training in the simulation station.

10. The system according to claim 1, wherein the rules data include data defining assessment rules that update the training assessment data of the student is updated in real time during the course of training.

11. A method for providing computerized training to a student, said method comprising:
providing a simulation station connected with a computer system with computer-accessible data storage supporting a rules engine operating continuously thereon;
storing lesson data in the data storage so as to be accessed by the rules engine, said lesson data comprising
learning object data defining a number of learning objects that each, when activated by the rules engine, cause the simulation station to output visual imagery, audio or other output, and
rules data defining a plurality of rules on which the rules engine operates so as to administer the computerized training, said rules each having a data condition part and an action part, the data condition part defining a state of data in the data storage that, when present, causes the rules engine to substantially immediately direct the computerized system to take a predetermined action defined in the action part, at least some of said actions comprising activating at least some of the learning objects to interact with the student at the simulation station;

storing student state data in the data storage, said student state data including training assessment data defining an assessment measure of a current training level of the student;

providing the computerized training to the student at the simulation station with the rules engine being continuously active and administering the training according to the rules stored in the data storage, said rules being configured such that the rules cause the simulation station, based on the student state data, to present a course of training comprising a series of said learning objects presented to the student at the simulation station;

automatically updating the training assessment data in real time during the presentation of the course of training as the assessment measure of the current training level of the student based on input received from the student at the simulation station;

storing the determined assessment measure in the student state data;

providing remediation of the current training level of the student substantially immediately by the rules data and the rules engine, wherein the rules data includes data that defines remediation rules that each causes the computer system to substantially immediately perform the action of said remediation rule when a data condition that the training assessment data of the student state data in the data storage indicates that a KSA gap is present in the current training level of the student, the action including initiating operation on the simulation station of a remedial training learning object selected from the stored learning objects; and wherein the remedial training learning objects are each configured to remediate the KSA gap indicated by the training assessment data of the student state data that causes activation of the associated remediation rule, and wherein, when said KSA gap is a gap in knowledge, the remedial training learning object is a knowledge-directed remedial learning object, wherein, when said KSA gap is a gap in skill, the remedial training learning object is a skill-directed remedial learning object, and wherein, when said KSA gap is a gap in ability, the remedial training learning object is an ability-directed remedial learning object.

12. A method according to claim 11, wherein the student state data includes completion data identifying any of the learning objects that the student has completed, and at least one of the rules has a data condition that requires that the completion data indicate completion of one of the learning objects as a prerequisite before another one of the learning objects is output to the student at the simulation station.

13. The method according to claim 11, wherein at least some of the learning objects include data defining video or audio media to be output to the student via the simulation station, or data defining virtual control panels configured to be output on one or more interactive touch panel PO devices in the simulation station so that the simulation station may be employed to emulate different vehicles for different lessons.

14. The method according to claim 11, wherein at least one of the learning objects when initiated causes the simulation station to display imagery generated in real-time by an image generator of the computer system using a virtual environment identified by the learning object and showing a view thereof from a position of the student in said virtual world.

15. The method according to claim 11, wherein the computer system is connected via a network to a learning management computer system storing data corresponding to a plurality of lessons, and said method further comprises downloading a second lesson from the learning management computer system over the network responsive to interactive communication between the simulation station and the learning management system over the network;

said second lesson comprising data defining a plurality of learning objects comprising media to be output to the simulation station, objective data defining responsive input to be received at the simulation station responsive to said media output and rules data associated with said learning objects configured so as to present the learning objects as a second course of training, including rules causing the computer system of the simulation station to repeatedly assess effectiveness of training of the student in said second lesson and to store data indicative of the assessment in the student state data, and to take different actions in regard to presenting the learning objects to the student based on different data conditions of the adjusted assessment data;

whereby the simulation station is configured to present the second course of training that is different from the first course of training.

16. The method of claim 15, and further comprising receiving over the network at the learning management computer system data indicative of a new student at the simulation station; and transmitting second student data to the simulation station so as to be stored in the data storage so that the second student can be trained at the simulation station.

17. The method of claim 11, and said automatic updating of the training assessment data including providing computerized output of a learning object to the student and processing a reaction input or absence of reaction input from the student.

18. The method of claim 17, and said output comprising media presenting a test question output to the student, and the reaction input comprising an answering input.

19. The method of claim 17, and the output comprising a presentation of a simulated condition of a simulated vehicle requiring the student to react by providing control input, the control input comprising an input in a simulated vehicle control panel or cockpit.

20. The method of claim 11, wherein one of said plurality of rules, when the KSA gap is a gap in knowledge, activates a knowledge-directed remedial learning object, another of said rules, when the KSA gap is a gap in skill, activates a skill-directed remedial learning object, and a third of said rules, when the KSA gap is a gap in ability, activates an ability-directed remedial learning object, so as to address gaps in knowledge, skill and ability in sequential priority.

21. The method of claim 11, and providing acceleration of the course of training of the student by the rules data and the rules engine, wherein the rules data includes data that defines acceleration rules that are activated by a respective data condition that the training assessment data indicates that the current training level of the student is at a sufficiently high KSA level, and that, when activated, the rule causes modification of the course of training by removing one or more of the learning objects therefrom, and shortens time required for the student for the course of training in the simulation station.

\* \* \* \* \*